US 12,503,310 B2

(12) United States Patent
Thable et al.

(10) Patent No.: US 12,503,310 B2
(45) Date of Patent: Dec. 23, 2025

(54) SYSTEM AND METHOD FOR MULTI-RACK STORAGE

(71) Applicant: Mytra, Inc., South San Francisco, CA (US)

(72) Inventors: Gagandeep Thable, San Francisco, CA (US); Christopher Walti, San Francisco, CA (US); Ahmad Baitalmal, San Francisco, CA (US)

(73) Assignee: Mytra, Inc., Brisbane, CA (US)

( * ) Notice: Subject to any disclaimer, the term of this patent is extended or adjusted under 35 U.S.C. 154(b) by 0 days.

(21) Appl. No.: 19/236,841

(22) Filed: Jun. 12, 2025

(65) Prior Publication Data
US 2025/0382133 A1 Dec. 18, 2025

Related U.S. Application Data

(60) Provisional application No. 63/658,942, filed on Jun. 12, 2024.

(51) Int. Cl.
*B65G 1/137* (2006.01)
*B25J 9/16* (2006.01)
(Continued)

(52) U.S. Cl.
CPC .......... *B65G 1/1371* (2013.01); *B25J 9/1664* (2013.01); *B65G 1/0414* (2013.01);
(Continued)

(58) Field of Classification Search
CPC .. B65G 1/1371; B65G 1/0414; B65G 1/0478; B65G 1/065; B65G 2201/0258; B25J 9/1664
See application file for complete search history.

(56) References Cited

U.S. PATENT DOCUMENTS 4,285,249 A 8/1981 Kume
4,541,297 A 9/1985 Fujita
(Continued)

FOREIGN PATENT DOCUMENTS

CN 109099128 A 12/2018
DE 102005006475 B3 5/2006
(Continued)

OTHER PUBLICATIONS

Clark, et al., "System and Method for Unified Material Storage and Transportation", U.S. Appl. No. 19/205,835, filed May 12, 2025.
(Continued)

*Primary Examiner* — Thomas Randazzo
(74) *Attorney, Agent, or Firm* — Jeffrey Schox; Evan Myers

(57) ABSTRACT

The system can include: a cell frame structure; a robot; and a motion planner. The system can optionally include a set of cell trays and a warehouse management system. The cell frame structure can include and/or define a set of payload storage cells; a set of transfer cells; a set of cell tray storage cells. However, the system can additionally or alternatively include any other suitable set of components. The system functions to automatically manage the storage of payloads within a grid-based structural system.

20 Claims, 12 Drawing Sheets

(51) Int. Cl.
*B65G 1/04* (2006.01)
*B65G 1/06* (2006.01)

(52) U.S. Cl.
CPC .......... *B65G 1/0478* (2013.01); *B65G 1/065* (2013.01); *B65G 2201/0258* (2013.01)

(56) References Cited

U.S. PATENT DOCUMENTS

| | | | |
|---|---|---|---|
| 6,598,708 | B2 | 7/2003 | St-germain et al. |
| 7,381,022 | B1 | 6/2008 | King |
| 8,721,251 | B1 | 5/2014 | Razumov |
| 9,856,111 | B1 | 1/2018 | Anderson et al. |
| 10,364,099 | B1 | 7/2019 | Brazeau |
| 10,399,772 | B1 | 9/2019 | Brazeau |
| 10,435,241 | B2 | 10/2019 | Lert et al. |
| 10,442,621 | B2 * | 10/2019 | Bestic ................. B65G 1/0471 |
| 11,554,917 | B2 | 1/2023 | Stevens et al. |
| 12,227,363 | B2 * | 2/2025 | Mahriche ............ B65G 1/0478 |
| 12,345,312 | B2 | 7/2025 | Ozog et al. |
| 2008/0277243 | A1 | 11/2008 | Hayduchok et al. |
| 2014/0182977 | A1 | 7/2014 | Chen |
| 2014/0202968 | A1 | 7/2014 | Kirby |
| 2015/0178673 | A1 | 6/2015 | Penneman |
| 2017/0121110 | A1 | 5/2017 | Zombori |
| 2019/0375589 | A1 | 12/2019 | Gravelle et al. |
| 2019/0389673 | A1 | 12/2019 | Shirouzu et al. |
| 2020/0087065 | A1 | 3/2020 | Gravelle et al. |
| 2020/0231384 | A1 * | 7/2020 | Lisso .................. B65G 1/0492 |
| 2021/0347569 | A1 | 11/2021 | Dayrell |
| 2022/0281118 | A1 | 9/2022 | Pavani |
| 2022/0281684 | A1 | 9/2022 | Fjeldheim et al. |
| 2023/0159272 | A1 * | 5/2023 | Cannon ................. B66C 17/20 414/277 |
| 2024/0025645 | A1 | 1/2024 | Moulin et al. |
| 2024/0140714 | A1 * | 5/2024 | Walti .................. B65G 1/0492 |

FOREIGN PATENT DOCUMENTS

| | | |
|---|---|---|
| GB | 2059540 A | 4/1981 |
| WO | 2012123335 A1 | 9/2012 |
| WO | 2022109452 A2 | 5/2022 |
| WO | 2022207574 A1 | 10/2022 |

OTHER PUBLICATIONS

Herrero, et al., "Method and System for Control of a Vertically Translatable Robot", U.S. Appl. No. 19/046,366, filed Feb. 5, 2025.

Walti, et al., "System and/or Method for Dynamic Rebalancing of Multi-Rack Storage", U.S. Appl. No. 18/964,303, filed Nov. 29, 2024.

* cited by examiner

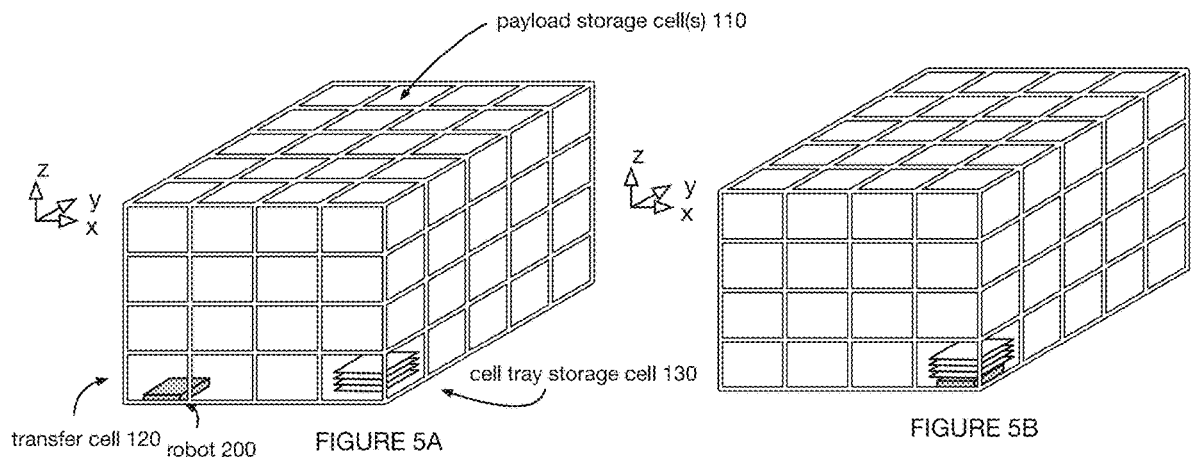
FIGURE 5A
FIGURE 5B
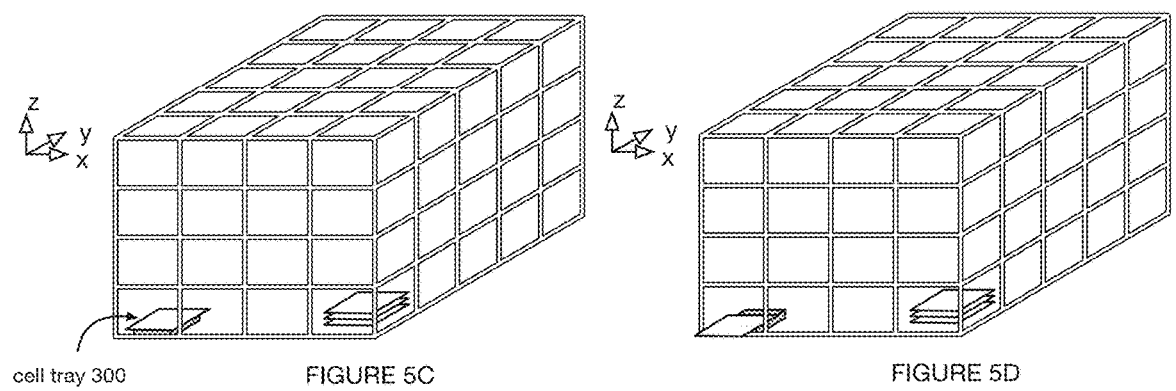
FIGURE 5C
FIGURE 5D

SYSTEM AND METHOD FOR MULTI-RACK STORAGE

CROSS REFERENCE TO RELATED APPLICATIONS

This application claims the benefit of U.S. Provisional Application No. 63/658,942, filed 12 Jun. 2024, which is incorporated herein in its entirety by this reference.

This application is related to U.S. application Ser. No. 18/964,303 filed 29 Nov. 2024, which claims the benefit of U.S. Provisional Application No. 63/604,069, filed 29 Nov. 2023, each of which is incorporated in its entirety by this reference.

This application is related to U.S. application Ser. No. 18/493,278, filed 24 Oct. 2023, which is incorporated in its entirety by this reference.

TECHNICAL FIELD

This invention relates generally to the technology field of warehouse automation, and more specifically to new and useful systems and/or methods for multi-rack warehouse storage in the warehouse automation field.

BRIEF DESCRIPTION OF THE FIGURES

FIGS. 5A-5D are examples of cells of the cell frame structure.

DESCRIPTION OF THE PREFERRED EMBODIMENTS

Figure 1:
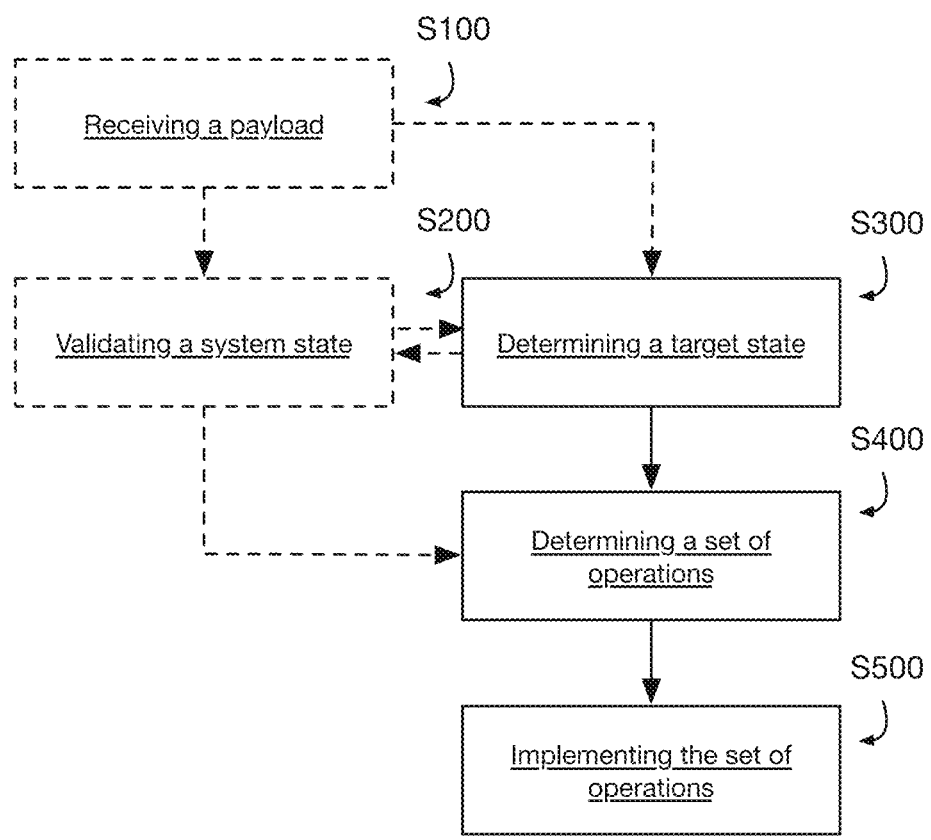
FIG. 1 is a schematic representation of a variant of the method.
Figure 2A:
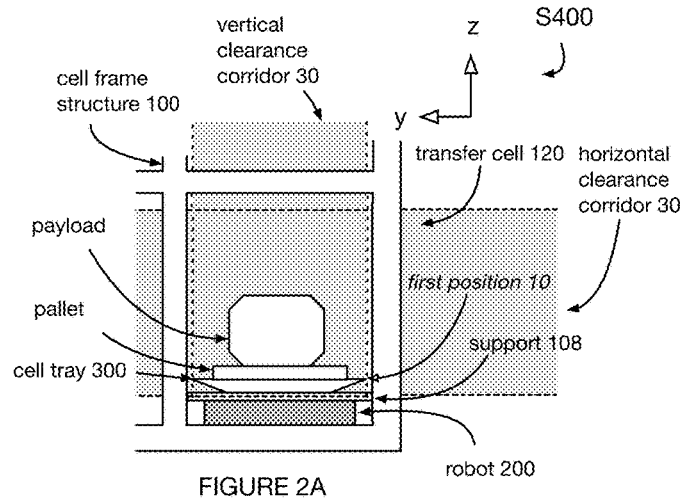
FIGS. 2A-2D are schematic representations of a variant of the system.
Figure 2B:
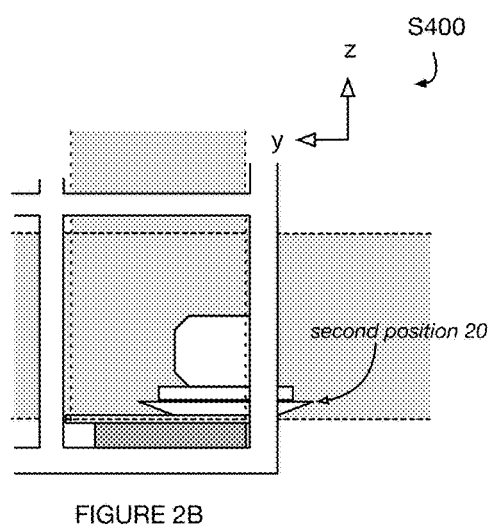
Figure 2C:
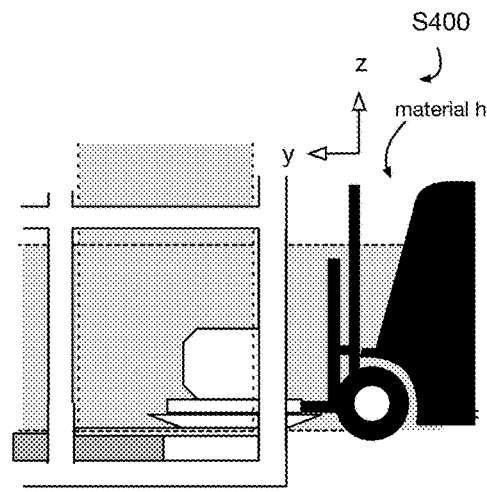
Figure 2D:
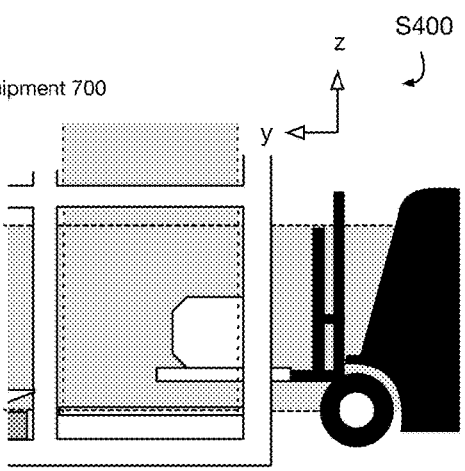

The following description of the preferred embodiments of the invention is not intended to limit the invention to these preferred embodiments, but rather to enable any person skilled in the art to make and use this invention.

1. Overview

The system, examples of which are shown in FIGS. 2A-2D, can include: a cell frame structure 100; a robot 200; and a motion planner 400. The system can optionally include a set of cell trays 300 and a warehouse management system 500. The cell frame structure can include and/or define a set of payload storage cells 110; a set of transfer cells 120; a set of cell tray storage cells 130. However, the system can additionally or alternatively include any other suitable set of components.

The system functions to automatically manage the storage of payloads within a grid-based structural system. In variants, the system can include and/or operate in conjunction with system components and/or methods described in U.S. application Ser. No. 18/964,303, filed 29 Nov. 2024 and U.S. application Ser. No. 18/493,278, filed 24 Oct. 2023, each of which is incorporated in its entirety by this reference. In some variants, the system can command and/or control (vertical) translation of robots using the system(s) and/or method(s) as described in U.S. application Ser. No. 18/531,184, filed 6 Dec. 2023, which is incorporated herein in its entirety by this reference.

The term "substantially" as utilized herein can mean: exactly, approximately, within a predetermined threshold or tolerance, and/or have any other suitable meaning.

1.1 Illustrative Example

Variants of the system can include a cell frame structure defining a three-dimensional (3D) grid of cells for storing payloads, a set of robots within the frame structure, wherein the robots are able to traverse the cell frame structure along vertical and/or horizontal clearance corridors connecting cells of the 3D grid of cells. Each robot can define a broad superior surface supporting a cell tray, which can in turn support a payload and/or a pallet carrying a payload. A motion planner can control a robot to move in multiple dimensions (e.g., three dimensions) throughout an interior of the cell frame structure to carry a cell tray to a desired position within the cell frame structure. In this illustrative example, the system can include a transfer cell within the cell frame structure, at which payloads can be inserted and/or retrieved by a vehicle (e.g., a forklift, etc.). At the transfer cell, robots can adjust a position of a cell tray to facilitate pickup by the vehicle, by moving the cell tray laterally within the transfer cell for easy access by forks of the forklift. In this illustrative example, the system can additionally include a cell tray storage cell within the cell frame structure. At the cell tray storage cell, multiple cell trays can be stored, awaiting retrieval and use by robots of the set of robots.

Figure 4A:
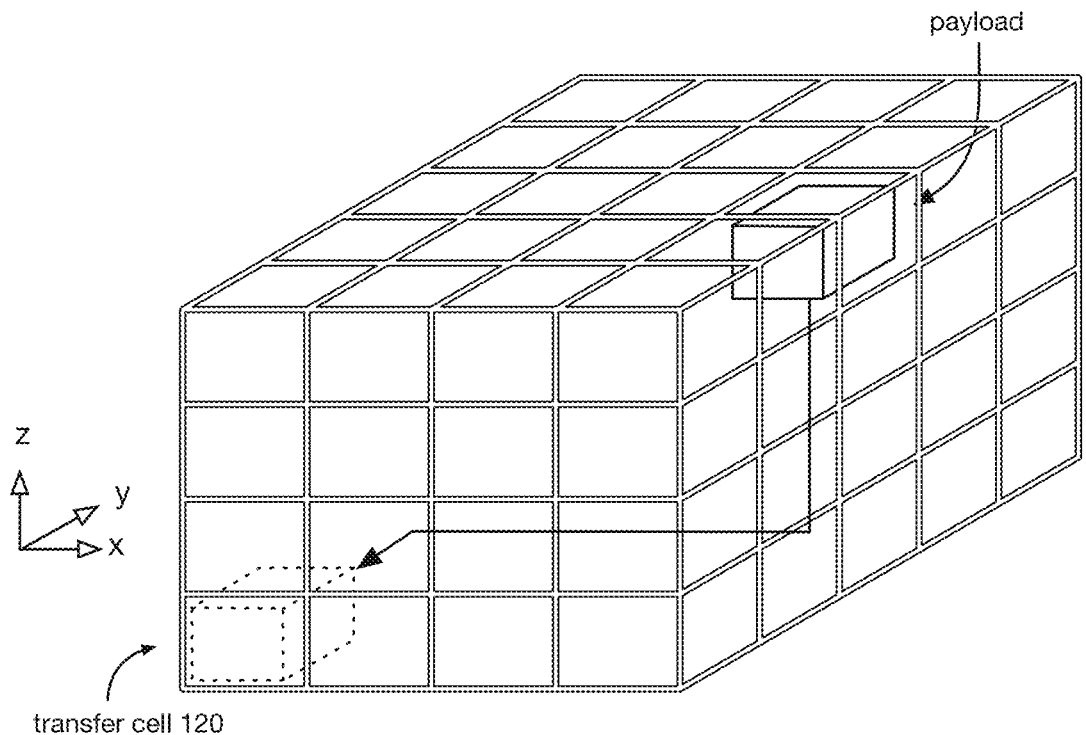
FIGS. 4A-4B are examples of the cell frame structure.
Figure 4B:
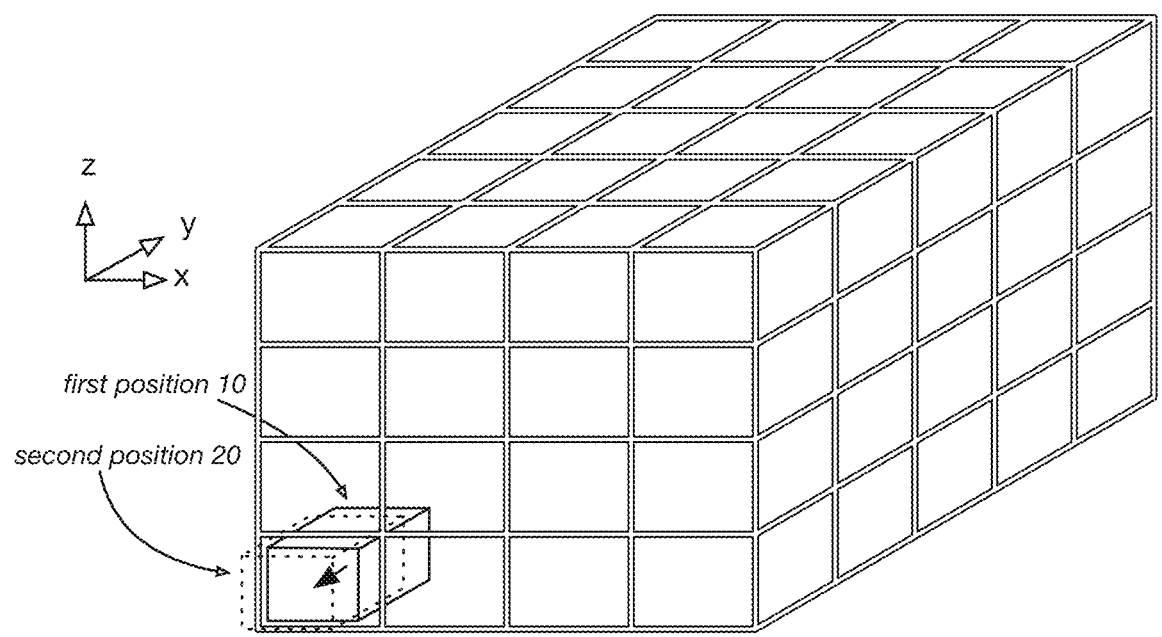

Variants of the method (e.g., an example is shown in FIG. 1) can include, at a robot, retrieving a cell tray from a cell tray storage cell by lifting the cell tray using a superior surface of the robot; at the robot, traversing the cell frame structure to deposit the cell tray at the transfer cell; receiving a payload onto the cell tray; using a set of sensors (e.g., cameras mounted within the cell frame structure, weight sensors at the broad superior surface of the robot, etc.), capturing a set of measurements of the payload; validating the payload by comparing its morphometric attributes to a set of morphometry requirements (e.g., maximum dimensions, weight, etc.); determining a set of actions (e.g., lift, traverse cell frame, deposit cell tray, etc.) for the robot to implement; at the robot, implementing the set of actions by traversing the cell frame structure in three directions (e.g., in the X, Y, and Z directions; example shown in FIG. 4A, etc.) to bring the cell tray and payload thereon to a payload storage cell; receiving a payload retrieval request; at the robot (and/or a different robot), traversing the cell frame structure to pick up the payload, traversing the cell frame structure to bring the payload to the transfer cell; and adjusting a position of the cell tray such that the payload is in a second position 20 offset from a central vertical axis of the transfer cell (e.g., example shown in FIG. 4B, etc.), such that a vehicle (e.g., a forklift, etc.) can pick up the payload from the cell tray.

However, the system can be otherwise configured and/or the method can be otherwise performed.

2. Benefits

Variations of the technology can afford several benefits and/or advantages.

First, variants of the technology can improve the transferability of payloads between a cell frame-based storage system and a vehicle (e.g., a forklift). In variants where cell trays and payloads thereon are stored within a rigid structure, a conventional vehicle may not be sized properly to fully access a cell tray within the cell frame. The implementation of placing a cell tray at a second position within a cell of the cell frame, wherein the second position is offset from the center of the cell (e.g., offset from clearance corridors passing through the cell, overlapping a boundary of a cell, etc.) can enable easy retrieval and/or deposition of a payload from/onto a cell tray. Furthermore, the pickup and retrieval from the second position can help protect the cell frame and elements thereon (e.g., robots, cell trays, payloads, etc.) from damage due to collision with a vehicle attempting to access the transfer cell.

Second, variants of the technology can improve the reliability of a robotic rack-based storage system. The implementation of a cell tray as an intermediate layer between a robot and a payload and/or pallet can enable the robots to reliably handle diverse types of payloads and/or pallets. The consistency of features of the cell tray (e.g., alignment features on an inferior side of the cell tray, etc.) can reduce misalignment between the cell tray and the cell frame structure, enabling payloads to occupy a larger three dimensional of a given cell without a need for a buffer zone between the payload and the frame. Furthermore, validation of payload morphometry (e.g., shape, size, weight distribution, etc.) before storage of the payload within the cell frame structure can both reduce the risk of collision between the payload and cell frame and also prevent abnormal stresses on robots and/or cell trays due to misaligned and/or unstable payloads.

Third, variants of the technology can improve the storage density of a grid-based storage system. The usage of cells which facilitate vertical motion in addition at least one degree of horizontal motion can enable robots in an interior of the cell frame structure to access payloads which are surrounded by occupied cells. In such variants, there can be multiple potential paths between a transfer cell (e.g., a cell at which payloads are added to the cell frame structure, etc.) and a payload storage cell. This can enable the system to store payloads densely throughout the cell frame structure without blocking access to other stored payloads. Furthermore, the usage of cells which passively facilitate multiple degrees of travel (e.g., including vertical travel, etc.) can enable the system to reconfigure internal pathways for robot traversal without requiring a physical remodeling of the cell frame structure.

Fourth, the implementation of specialized cells (e.g., cells enabling particular combinations of directions of motion, a transfer cell, a cell tray storage cell, etc.) within the frame can enable the system to encapsulate multiple different functions within a single three-dimensional block of cells.

Fifth, the usage of cell-based robot control can improve the warehouse safety. For example, limiting robot speed in cells proximal to a transfer cell (e.g., proximal to an interface between the grid and the rest of a warehouse environment, etc.) can reduce the risk of a collision between a robot and a human or vehicle near the transfer cell.

However, variations of the technology can additionally or alternately provide any other suitable benefits and/or advantages.

3. System

The system, an example of which is shown in FIG. 1, can include: a cell frame structure 100; a robot 200; and a motion planner 400. The system can optionally include a set of cell trays 300 and a warehouse management system 500. The cell frame structure can include and/or define a set of payload storage cells 110; a set of transfer cells 120; a set of cell tray storage cells 130. However, the system can additionally or alternatively include any other suitable set of components.

The system functions to automatically manage the storage of payloads within a cell frame structure. In variants, the system can include and/or operate in conjunction with system components and/or methods described in U.S. application Ser. No. 18/964,303, filed 29 Nov. 2024 and U.S. application Ser. No. 18/493,278, filed 24 Oct. 2023, each of which is incorporated in its entirety by this reference. In some variants, the system can command and/or control (vertical) translation of robots using the system(s) and/or method(s) as described in U.S. application Ser. No. 18/531,184, filed 6 Dec. 2023, which is incorporated herein in its entirety by this reference.

3.1 Cell Frame Structure

The cell frame structure 100 functions to support cell trays and facilitate traversal of robots for lifting cell trays. The cell frame structure 100 can define a 3D grid of cells between members of the cell frame structure 100. The 3D grid of the cell frame structure 100 is preferably defined in rectangular coordinates (i.e., in a rectilinear grid), but can alternatively be defined in cylindrical coordinates, or can alternatively be defined in another suitable coordinate system(s). In an example, the cell frame structure 100 is the "storage grid 200" of U.S. application Ser. No. 19/205,835, filed 12 May 2025, which is incorporated herein in its entirety by this reference. Members of the cell frame structure 100 can include beams, rails 106, and columns 104, each extending along the X axis, Y axis, Z axis, and/or another suitable axis. In a variant, the cell frame structure 100 can include cell frame supports 108 (e.g., brackets for statically supporting cell trays). The cell frame supports 108 can extend along the X axis, Y axis, Z axis, a diagonal axis perpendicular to one of the aforementioned axes (e.g., the Z axis), and/or an axis in any other suitable direction. The cell frame supports 108 of the cell frame structure preferably all extend in the same direction, but can alternatively extend in different directions. The cell frame structure 100 is preferably modular, but can alternatively be non-modular. Modules of the cell frame structure 100 (e.g., each defining a single cells, multiple cells, etc.) can facilitate motion of the robot in any/all of the X direction, Y direction, and/or Z direction. In examples, different modules of the cell frame structure 100 can facilitate motion of the robot in different directions.

The number of cells within a cell frame structure 100 can be 1, 2, 10, 20, 50, 100, 500, 1000, 5000, 10000, a number in an open or closed range bounded by the aforementioned values, and/or any other suitable number of cells. For example, the number of cells within the frame structure can be flexibly scaled (e.g., modularly) to accommodate application specific storage needs and/or throughput. The cell frame structure 100 can define cells of varying types. For example, the cell frame structure 100 can include payload storage cell(s), transfer cell(s), cell tray storage cell(s), and/or cells of any other suitable cell. In specific examples, a module of the cell frame structure 100 can facilitate motion in the X direction, in the Y direction, in the Z direction, in an XY plane, in a YZ plane, a ZX plane, the XYZ rectilinear space, and/or in any other suitable direction. The cell frame structure 100 can define clearance corridors 30 passing through multiple cells in series (e.g., linking outer boundaries of the overall cell frame structure, etc.), which can be horizontal corridors in the X and Y directions and vertical in the Z direction.

The clearance corridors of the cell frame structure 100 are preferably large enough for a cell frame, payload, pallet, and/or robot to fit through. The clearance corridors preferably have rectangular profiles perpendicular to a longitudinal axis but can alternatively have any other suitable profile. The clearance corridors of the cell frame structure 100 are preferably linear, but can alternatively be non-linear. In an example, when a robot is in a center of a cell, the cell tray and/or payload thereon can be within three distinct clearance corridors orthogonal from each other. When the robot translates (e.g., by traversing the cell frame structure), the cell tray and/or payload thereon can leave two out of three clearance corridors while traveling along the third. The clearance corridors preferably terminate at an outer boundary (e.g., envelope) of the overall cell frame structure 100, but can alternatively pass through the outer boundary of the cell frame structure 100. In an example, the clearance corridor passes through the outer boundary of only the transfer cell. In an example, the robot can traverse the cell frame structure 100 horizontally such that a cell tray and/or payload thereon can enter and/or leave a vertical clearance corridor. In another example, the robot can traverse the cell frame structure 100 vertically and/or can vertically actuate a superior broad surface of the robot such that the cell tray and/or payload thereon can enter and/or leave the horizontal clearance corridor. In an example, the cell frame structure 100 can define a plurality of vertical series of cells which function as an elevator column (e.g., facilitating vertical motion of cell trays, etc.). In this example, such elevator columns can be programmatically defined or physically defined. In this example, such elevator columns can be dynamically determined (e.g., as necessary based on a storage density of the system, etc.) or predetermined. Such elevator columns can be interior to the cell frame structure 100 (e.g., not forming a lateral outer face of the cell frame structure) or can be exterior to the cell frame structure 100.

However, the cell frame structure 100 can otherwise include or not include vertical elevator columns.

The cell frame structure can include and/or define a set of payload storage cells 110 which function to store payloads and optionally facilitate traversal through the cell frame structure by the robot, cell tray, and/or payload. The percentage of the cell frame structure that are payload storage cells 110 can be 50%, 75%, 80%, 90%, 95%, 98%, 99%, a percentage within an open or closed range bounded by the aforementioned values, and/or any other suitable percentage. The payload storage cell 110 can alternatively act as a storage location for a payload or an intermediate point on a traversal path for a payload (e.g., when the payload storage cell isn't storing a payload and cell tray, etc.). The payload storage cell 110 can be located at an exterior of the cell frame structure (e.g., non-adjacent to a cell at least one side, etc.), at an interior of the cell frame structure (e.g., surrounded on all six sides by another cell, etc.), on a bottom layer (e.g., directly vertically superior to no other cell) of the cell frame structure, on a top layer (e.g., directly vertically inferior to no other cell), on an intermediate layer, and/or at any other suitable location. In a first example, the cell can be vertically aligned (e.g., along the z-axis) with the transfer cell. In a second example, the cell can be horizontally aligned (e.g., along a y- or x-axis) with the transfer cell.

However, the payload storage cell 110 may be otherwise configured.

The cell frame structure can include and/or define a set of transfer cell(s) 120 which function to facilitate transfer of payloads in and/or out of the cell frame structure. The transfer cell 120 can be equivalently referred to as an "operations cell" or "ops cell". The transfer cell 120 is preferably on a bottom layer of the cell frame structure, but can alternatively be above the bottom layer of the cell frame structure. The transfer cell 120 is preferably on an exterior of the cell frame structure, but can alternatively be on an interior of the cell frame structure. The cell frame structure can include 1 transfer cell 120, 2 transfer cells 120, 3 transfer cells 120, 5 transfer cells 120, 10 transfer cells 120, 20 transfer cells 120, 100 transfer cells 120, and/or any other suitable number of transfer cells 120. In an example, all transfer cells facilitate transfer of cell trays through a side aligned on the same axis (e.g., at a frontal Y-axis, as shown in FIG. 5D, etc.).

However, different transfer cells can facilitate transfer of cell trays and/or payloads thereon in different directions.

Figure 11:
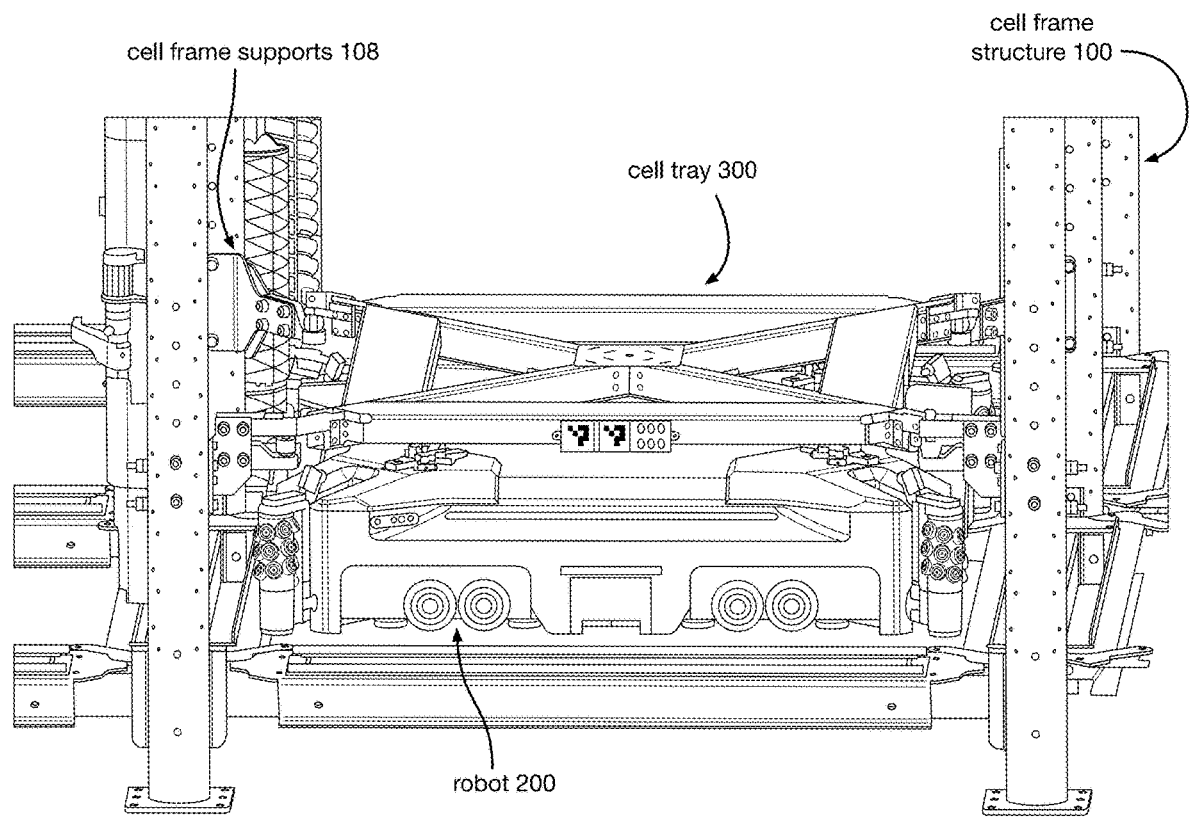
FIG. 11 is an illustrative example of a variant of transfer cell.
Figure 12:
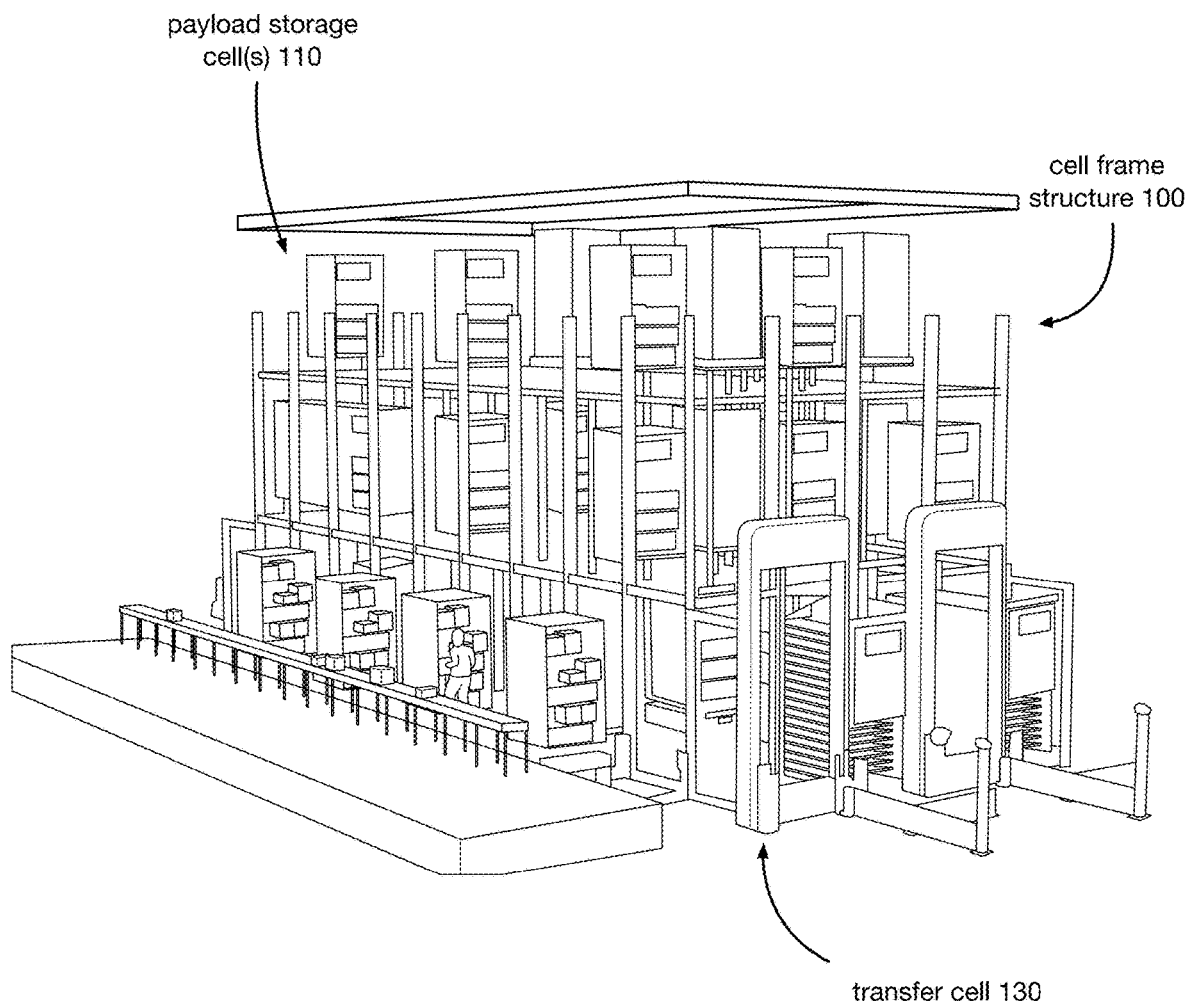
FIG. 12 is an illustrative example of a variant of a cell frame structure.

The transfer cell 120 can be the same size as other cells of the cell frame structure (e.g., payload storage cells, etc.) or can be a different size than other cells of the cell frame structure. In variants where the transfer cell 120 is larger than other cells of the cell frame structure, the dimensions of the transfer cell 120 (e.g., X dimension, Y dimension, Z dimension, etc.) can be greater or lesser than dimensions of the payload storage cell by 1%, 5%, 10%, 20%, 25%, 50%, 100%, 200%, a percentage within an open or closed range bounded by the aforementioned values, and/or any other suitable percentage. The transfer cell 120 can be defined by a cell frame module of a specific type (e.g., a particular arrangement of cell frame supports, etc.) but can alternatively be defined by a generic cell frame module (e.g., a cell frame module defining a payload storage cell, etc.) operating in a transfer cell mode. In specific example, the transfer cell has a different arrangement of cell frame supports from payload storage cells (e.g., wherein the cell frame supports are horizontally closer to an ingress/egress side of the transfer cell than are cell frame supports in payload storage cells, etc.). In a specific example, cell frame supports at a back side of the transfer cell (e.g., distal from the ingress/egress side) are diagonal, relative to the X and/or Y axes, and the cell frame supports at the ingress/egress side are parallel and/or perpendicular to the X and/or Y axes; example shown in FIG. 11, etc.). The transfer cell can be aligned with or offset from other cells of the cell frame structure (e.g., example shown in FIG. 12). In a specific example, the cell frame structure does not include any cell directly above the transfer cell; however, the cell frame structure can alternatively define cells directly (e.g., at the second level) or indirectly (e.g., at the third level or above) above the transfer cell 120. In a specific example, the transfer cell is separate from the rest of the cell frame structure, and the material handling equipment can deposit and/or retrieve a payload without entering the cell frame structure. The transfer cell 120 preferably facilitates transfer via a single lateral side (e.g., ingress/egress side) of the transfer cell 120, but can alternatively facilitate transfer via 2, 3, or 4 lateral sides. In variants, a side of the transfer cell 120 which transfer can refer to a side which has a clearance corridor passing through it, a side with an opening large enough to fit a cell tray and/or payload thereon, a side with a set of supports large enough to support multiple positions of the cell tray (e.g., the first position 10 and second position 20, example shown in FIG. 2A and FIG. 2B, etc.), and/or can refer to any other specific attributes of the transfer cell 120. The transfer cell 120 preferably facilitates transfer of payloads between the cell frame structure and material handling equipment 700 (e.g., a forklift, a hand truck, a gantry crane, a hoist, a dolly, a scissor lift table, etc.; example shown in FIG. 2C and FIG. 2D, etc.), but can alternatively facilitate transfer directly with humans (e.g., picking up payloads, etc.). The transfer cell 120 can include material handling equipment that can be automated or manually controlled. Examples of automated material handling equipment can include automated guided vehicles (AGV), autonomous mobile robots (AMR), autonomous case-handing robots (ACR), goods-to-person (GTP) robots, and/or any other suitable type of automated material handling equipment. In an example, cell frame supports 108 for the transfer cell 120 can be larger than cell frame supports for payload storage cells (e.g., to facilitate motion of the cell tray between a first position and second position). In a specific example, cell frame supports can include a linear member linking columns of the transfer cell 120 in the y-direction. The transfer cell(s) can optionally operate in multiple modes (e.g., an ingress mode, configured to accept payloads into the system; an egress mode, configured to make payloads available for retrieval by a material handling equipment; etc.). In an example, when the transfer cell is in the ingress mode, the warehouse management system can monitor the transfer cell (e.g., via the set of sensors, via a cell tray tracking system, etc.) to ensure that an empty cell tray is available within the transfer cell. In a second example, the warehouse management system can add a cell tray to the transfer cell only when an operator requests to add a payload to the cell frame structure and/or when a payload or approaching material handling equipment is detected (e.g., in this example, warehouse management system switches the transfer cell to the ingress mode, etc.). In a third example, when the transfer cell is in the egress mode, the warehouse management system can monitor the transfer cell to ensure that the transfer cell is empty (e.g., free of a cell tray, etc.) to ensure that the system is ready for ingress of a payload. In a fourth example, the system can switch between ingress and egress modes based on what requires minimal robot operations (e.g., switching from egress to ingress due to an available cell tray being in the transfer cell, etc.). However, the transfer can alternatively not operate according to modes or can operate according to any other suitable modes. In a specific example, the cell frame structure can include a subset of transfer cells in an ingress mode and a subset of transfer cells in an egress mode, wherein the transfer cells in egress mode are distinct from the transfer cells in ingress mode. In this specific example, the number of cells in ingress mode and/or egress mode can change over time (e.g., according to the ingress/egress volumes of the system) or be static.

In variants, cell frame supports for the transfer cell 120 can include dampers and/or other frame protection elements (e.g., to account for unpredictable force caused by human operators of material handling equipment, etc.). In an example of this variant, the cell frame supports of the transfer cell 120 can include dampers, and the cell frame supports of the payload storage cells can exclude dampers (e.g., due to predictable and controllable forces put on supports by robots depositing cell trays, etc.). In a specific example, the dampers can support the cell tray specifically while the cell tray is in the second position. In variants, the dampers can support or not support the cell tray while the cell tray is in the first position. In variants, the transfer cell can include a set of sensors mounted to the cell frame structure (e.g., at the top of the transfer cell pointing downwards, etc.) to provide measurements for payload validation (e.g., S200), transfer cell occupancy monitoring (e.g., checking if the transfer cell has a cell tray and/or if the cell tray is in a suitable position which satisfies a set of X-Y position constraints, etc.). The set of sensors of the cell tray can include any of the sensors described for the robot.

The transfer cell 120 can define at least a first position 10 and a second position 20, which is preferably distinct from the first position in at least a subset of the x-direction, y-direction, and/or z-direction. The first position 10 can be a position within the transfer cell 120 (e.g., along a central vertical axis of the transfer cell, etc.) in which a cell tray (and payload thereon) is entirely within the transfer cell 120 and/or a plurality of clearance corridors thereof (e.g., 1 clearance corridor, 2 clearance corridors, 3 clearance corridors, etc.). Preferably, a cell tray at the first position is within a higher number of clearance corridors as a cell tray at the second position. In an example, the first position of the transfer cell 120 is aligned along a same vertical axis as a payload storage position for a payload storage cell directly above the transfer cell 120.

Cell trays at the first position are preferably inaccessible to (e.g., unable to be picked up by, etc.) material handling equipment external to the cell frame structure of the transfer cell 120, but can alternatively be partially or fully accessible to material handling equipment. The first position can be on a set of supports of the cell frame, alternatively above the set of supports, or in another suitable vertical location within the transfer cell 120. The second position 20 can be a position in which a cell tray (and payload thereon) is horizontally offset from a central axis of the cell, is partially outside a boundary of the cell (e.g., is intersecting a boundary of the cell), is partially outside a clearance corridor passing through the cell, and/or is otherwise defined. In a specific example, when a cell tray is in the second position, it intersects an outer boundary of the overall cell frame structure as well as an outer boundary of the transfer cell 120. The second position of the transfer cell 120 can be predetermined or dynamically determined (e.g., based on a center of mass of the payload and/or cell tray, based on a type of material handling equipment (e.g., a forklift fork length, etc.)). Cell trays at the second position are preferably accessible to (e.g., able to be picked up by, etc.) material handling equipment external to the cell frame structure, but can alternatively be only partially accessible to material handling equipment. A horizontal distance (e.g., in the x-direction and/or y-direction) between the first position and second position of the transfer cell 120 can be 0 inches, 1 inch, 2 inches, 4 inches, 6 inches, 12 inches, 16 inches, 18 inches, 24 inches, 30 inches, 40 inches, 48 inches, 56 inches, a distance within an open or closed range bounded by the aforementioned values, and/or any other suitable distance. A vertical distance between the first position and second position of the transfer cell 120 can be 0 inches, 0.5 inches, 1 inch, 2 inches, 4 inches, 6 inches, 12 inches, 16 inches, 18 inches, 24 inches, a distance within an open or closed range bounded by the aforementioned values, and/or any other suitable distance.

In an example, the horizontal distance between the first position and second position of the transfer cell 120 enables forks of a forklift to get sufficiently deep into a pallet of a payload (and/or a cell tray) in order to pick the pallet up. In this example, a portion of the material handling equipment (e.g., the forks) can enter the transfer cell 120 without the rest of the material handling equipment (e.g., the forklift cab) entering the transfer cell 120.

However, the transfer cell 120 may be otherwise configured.

The cell frame structure can include and/or define a set of cell tray storage cells 130 which function to store cell trays within the cell frame structure. The cell tray storage cell 130 is preferably laterally adjacent to and/or vertically adjacent to at least one of a payload storage cell, a transfer cell, and/or another cell tray storage cell (e.g., example shown in FIG. 5A). The cell tray storage cell 130 preferably stores multiple cell trays (e.g., vertically stacked, horizontally or vertically racked, etc.), but can alternatively store a single cell tray. The robot can retrieve a cell tray (e.g., from a multiplicity of cell trays, such as a stack; etc.) from below (e.g., example shown in FIGS. 5B and 5C, etc.), from a lateral side, and/or additionally/alternatively from another suitable angle. The cell tray storage cell 130 can store cell trays at fixed, indexed positions (e.g., within a rack, etc.), at variable, non-indexed positions (e.g., where the cell trays stack freely with one another, etc.). In an example, when a robot retrieves a cell tray from the storage cell 130, a remainder of cell trays within the storage cell 130 can change position (e.g., move down, etc.). In a first variant, a robot can engage a supported cell tray with the stack and/or a cell frame support integrated with the frame and supporting the stack. In an example of this variant, a robot can lift a superior surface of the robot to push a tray into a bottom of the stack. In this variant, the cell frame support can be passive (e.g., moved to the side by the robot to facilitate addition of the cell tray) or active (e.g., can actuate responsive to a command from the robot, etc.). In a second variant, an actively-controlled component at the cell tray storage cell 130 (e.g., separate from the robot) can pick up the cell tray and add the tray to the stack. In a third variant, a robot can lift a cell tray to a position corresponding to an index of the cell tray, and can either push the cell tray into the stack or can engage with a stack cell tray storage cell robot which pulls the tray into the stack. The robot preferably deposits cell trays into the stack while occupying the cell tray storage cell 130, but can alternatively deposit cell trays into the stack while occupying a cell adjacent to the cell tray storage cell 130 or an intermediate zone between cells (e.g., to get close to the stack, etc.). In variants, when performing a cell tray pickup operation in S400, the robot can select a particular cell tray from the stack or can select a tray at a predetermined index (e.g., the top of the stack, the bottom of the stack, etc.) from the cell tray storage cell 130. The cell tray storage cell 130 is preferably passive (e.g., no actively-controlled support components), but can alternatively be active, electromechanically controllable (e.g., by the robot, motion planner, and/or warehouse management system), and/or can be otherwise configured.

However, the cell tray storage cell 130 can be otherwise configured.

However, the cell frame structure 100 can be otherwise configured.

3.2 Robot

The robot 200 functions to move cell trays within the cell frame structure. The robot 200 can perform S100, S500 and optionally S200 and/or any other suitable processes. In a first example, the robot 200 can be and/or include any components of the "material handling robot" of U.S. application Ser. No. 18/493,278, filed 24 Oct. 2023, which is incorporated herein in its entirety by this reference. In a second example, non-exclusive with the first example, the robot 200 can include any suitable components of the "robot" of U.S. application Ser. No. 19/046,366, filed 5 Feb. 2025, which is incorporated herein in its entirety by this reference. In variants, the robot 200 can include: a chassis, a computing system onboard the chassis, and a sensor suite communicatively coupled to the controller. The robot 200 can include a plurality of orthogonal drive mechanisms (e.g., X-drive, Y-drive, Z-drive, etc.) controlled by an onboard computing system (and/or a controller thereof). The vertical drive mechanism can be articulated between a retracted configuration and a deployed/engaged configuration by a (respective) set of deployment mechanisms, such as linear actuators. In an example, a vertical drive mechanism(s) can be deployed at the corners of the chassis (e.g., deployed outward beyond a rectangular footprint defined by the lateral drive mechanisms and/or a planar intersection of the Y-drive mechanism travel and X-drive mechanism travel) using a spring-loaded linear actuator. Additionally, the robot 200 can selectively deploy (i.e., disengage) and/or retract (i.e., engage) a payload and/or support tray thereof. The robot 200 preferably includes and/or defines a broad superior surface, equivalently referred to herein as a platform, where the platform functions to support a cell tray during payload ingress, payload egress, while adjusting a position of the cell tray, during storage, and/or at any other times. In an example, the platform can include a set of robot alignment features configured to mate with cell tray alignment features. In a first variant, the robot 200 can engage with the cell tray at the cell tray alignment features (e.g., where all force path between the cell tray and robot pass through the cell tray alignment features; e.g., when the robot is traversing the cell frame structure with the cell tray and payload, etc.). In a second variant, non-exclusive with the first, the robot 200 can engage with the cell tray at locations distinct from the cell tray alignment features (e.g., when the robot is adjusting a position of the cell tray from the first position to the second position). Additionally, the robot 200 can define a full or partial enclosure to contain materials, a cavity, and/or any other suitable features for containing material(s). The robot 200 can include or be used in sensor suite which functions to collect measurements to facilitate actuation controls and can additionally function to facilitate autonomous perception/navigation of the robot 200. The sensor suite can include: proprioception sensors, actuator encoders, internal sensors (e.g., encoders, actuator sensors, accelerometers, gyroscopes, IMU, INS, temperature sensors, voltage/current sensors, etc.), environmental sensors, antennas (e.g., GPS, cellular, Bluetooth, Wi-Fi, Near Field Communication, etc.), drive mechanism sensors (e.g., encoders, cameras, time-of-flight sensors, voltage/current sensors, accelerometers, force sensors, contact sensors, etc.; inboard and/or outboard ends, such as encoders at both the actuator and the wheel), wheel encoders, deployment mechanism sensors (e.g., position sensing, spring feedback sensing, spring force sensors, etc.), payload sensors (e.g., force sensors/switches, cameras, proximity sensors, payload envelope sensors, payload engagement sensors, etc.), perception suite sensors (e.g., cameras, time-of-flight sensors, proximity sensors, radar, Lidar, etc.; support frame sensors, etc.), integrated actuator sensors, and/or any other suitable set of sensors. The sensors can include one or more: Radar sensors, LIDAR sensors, cameras, camera arrays, time-of-flight sensors, time-of-flight arrays, spatial sensors, location sensors, force sensors, onboard diagnostic sensors (such as vehicle mechanism sensors), audio sensors, barometers, light sensors, temperature sensors, current sensors, voltmeters, contact sensors, proximity sensors, vibration sensors, ultrasound sensors, electrical sensors, pressure sensors, and/or any other suitable sensors. However, the robot 200 can include any other suitable sensors.

The sensor suite of the robot 200 can facilitate odometry and/or localization relative to frame features (e.g., cells and/or coordinate positions therein; helical rack geometry; fiducials; etc.), dead reckoning, and/or can otherwise facilitate localization within the frame structure and/or along a vertical axis or vertical cell array thereof. The sensors are preferably communicatively coupled to the computing system to facilitate perception and/or control, but can alternatively be otherwise coupled. For instance, the sensor suite can be configured to collect data at various frequencies and/or resolutions, depending on the specific requirements of the operating environment. The collected data can be processed and analyzed in real-time (or near real time) to inform the autonomous decision-making and control at the computing system. In a variant, the robot 200 can include cameras to facilitate determination of location information for the robot 200. Location information can include relative distance between the robot 200 and another robot, relative distance between the robot 200 and a next cell of the cell frame structure, relative distance between the robot 200 and a transfer cell, relative distance between the robot 200 and a low-speed zone, and/or any other suitable type of location information. In an example of this variant, cameras onboard the robot 200 can scan a QR code on a cell frame structure element and/or another robot in order to determine a location information for the robot 200 and/or to determine a command for the robot 200 (e.g., based on the location information, based on the QR code directly, etc.). In this example, the cameras can continuously monitor for QR codes during traversal of the cell frame structure, can monitor for QR codes when passing a predetermined location within a cell, and/or can monitor for QR codes at any other suitable time. In a specific example, a QR code indicates proximity to a transfer cell, and responsive to scanning the QR code (e.g., during traversal of the frame) the robot 200 adjusts its speed (e.g., decreasing speed when within a threshold number of cells near a transfer cell, when within a threshold distance of a transfer cell, etc.). In a specific example, while the robot 200 passes through an intermediate cell while on a traversal pathway between two cells of the cell frame structure, the robot 200 can adjust its speed based on the current cell index, a future cell index, a current speed, and/or any other suitable parameters. In an example, the robot 200 slows down based on a current cell being within a threshold distance of a transfer cell. In another example of this variant, cameras onboard the robot 200 can scan for a QR code on a cell tray (e.g., to extract information about the cell tray, such as cell tray age, weight limits, etc.; to determine a distance of the cell tray from the robot; to determine an alignment of the cell tray with the robot, etc.) In a variant, the robot 200 can optionally include payload sensors (e.g., pressure sensors, spring force sensors, proximity sensors, payload envelope sensors, etc.) to monitor a state of the payload during validation (e.g., during S200). In an example, the robot 200 includes a plurality of payload sensors, each payload sensor at a physical coupling point between the cell tray and the robot 200 (e.g., at/proximal the robot alignment features). In a first specific example, differential readings from different payload sensors can be used to estimate the center of mass of cell tray. In a second specific example, differential readings from different payload sensors during robot motion (e.g., "wiggling") can be used to estimate a stability of a payload. In such specific examples, center of mass and/or stability can be evaluated during validation. However, payload sensors can be configured in other ways. The robot 200 is preferably constrained to move within the cell frame structure (e.g., by members of the frame, programmatically, etc.), but can alternatively move within an environment outside of the cell frame structure. The robot 200 is preferably configured to move between the payload storage cell, transfer cell, cell tray storage cell, and/or any other suitable cell (e.g., example shown in FIG. 5B, FIG. 5C, and FIG. 5D, etc.).

However, the robot 200 may be otherwise configured.

3.3 Cell Tray

The cell tray 300 functions to provide an interface between a robot and a payload and/or pallet. The cell tray 300 can perform S100 and/or any other suitable processes. The cell tray 300 is preferably rectangular, but can alternatively be another suitable shape (e.g., X-shaped, circular, etc.). The cell tray 300 preferably defines a flat superior surface, but can additionally and/or alternatively define mounting/alignment features at the superior surface. The cell tray 300 is preferably separate and distinct from a pallet supporting the payload but can alternatively be and/or act as a pallet itself (e.g., by interfacing directly with the payload). The cell tray 300 can be closed (e.g., without gaps laterally separating regions of the cell tray, etc.), alternatively fenestrated (e.g., with gaps laterally separating regions of the cell tray, as when the cell tray is formed from multiple members, etc.). In an example, the cell tray 300 can be rectangular with dimensions similar to a pallet, with a length of about 40 inches and a width of about 48 inches. However, the cell tray 300 can have other suitable dimensions.

The cell tray 300 preferably defines a set of cell tray alignment features at an inferior side (e.g., for aligning the cell tray to the robot and therefore the cell frame structure), but can alternatively define the set of cell tray alignment features at any other suitable location. The cell tray 300 alignment features can include locating bosses, pins, dowels, rabbets, tongues, grooves, chamfered edges, magnets, compliant pins, and/or any other alignment features. Cell tray alignment features can align the cell tray 300 in the X-direction, Y-direction, Z-direction, a diagonal direction in the X-Y plane, and/or any other suitable direction. In a first variant, the cell tray alignment features can align a central axis of the cell tray 300 to a central axis of the robot. In a second variant, the cell tray 300 alignment features can align a central axis of the cell tray 300 to a central axis of the cell (e.g., at the ops cell, for centering the payload, etc.). However, the cell tray 300 alignment features can align the central axis of the cell tray 300 to any other suitable system component or axis. In an example, the cell tray 300 can define a plurality (e.g., four) of cell tray alignment features along two diagonals of the inferior surface of the cell tray 300, wherein each cell tray alignment feature constrains point translation of the cell tray 300 relative to the robot in one dimension (e.g., wherein the constraining direction of each cell tray alignment feature differs between different alignment features).

The cell tray 300 can preferably constrain the payload in one direction (vertically, parallel with a weight vector, etc.) but can alternatively constrain the payload along other axes and/or about other rotational axes. However, the cell tray 300 can otherwise constrain or not constrain the payload. During traversal of the grid and/or storage of the payload, the payload is preferably at the center of the cell tray 300 (e.g., wherein the center of mass of the payload is proximal the center of the cell tray 300) but can alternatively be arranged with a center of mass offset from the center of the cell tray 300. The cell tray 300 can include boundary features (e.g., features to constrain lateral motion of the payload and/or pallet; along the X-axis edges of the cell tray, along Y-axis edges of the cell tray, around a perimeter of the cell tray, etc.), which can include lips, raised rails, side walls, corner posts, textured surfaces (e.g., gripping surfaces, etc.), and/or any other structural elements.

The cell tray 300 is preferably passive (e.g., no sensors, no processor, etc.), but can alternatively be active. The cell tray 300 can be made of plastic, metal (e.g., steel, aluminum), wood, and/or any other suitable material. In a specific example, the cell tray can include an X-shaped structural beam linking diagonal corners, with flat plastic surfaces spanning arms of the structural beams. When not in use, the cell tray 300 is preferably stored at a cell tray storage cell within the cell frame structure, but can alternatively be stored outside the cell frame structure, palletized, and/or otherwise housed. The number of cell trays 300 in use (e.g., the number of cell trays outside of the cell tray storage cell 130) is preferably variable/dynamic, but can alternatively be static, directed by the warehouse management system, and/or can be otherwise configured.

However, the cell tray 300 may be otherwise configured.

3.4 Motion Planner

The motion planner 400 functions to determine a set of operations for a robot within the cell frame structure. Additionally or alternatively, the motion planner 400 can function to impose robot collision constraints, maintain state awareness of robots and/or robot trajectories throughout the cell frame structure, and/or provide any other suitable functionalities. In variants, the motion planner 400 can perform S400 and/or any other suitable processes. The motion planner 400 preferably receives a target state and/or a set of target payload/cell endpoints from a warehouse management system and determines a set routing and/or control instructions for the robots based on the target state. For instance, the motion planner 400 can direct robot actions, paths, trajectories, and/or can provide any other suitable control outputs to robots within the system. In a first variant, the motion planner 400 can generate robot routes and/or control instructions based on the target state using classical methods and/or algorithmic techniques (e.g., sets of algorithms like cooperative ASTAR, conflict-based searches, cooperative searches, etc.). In a second variant, nonexclusive with the first, the motion planner 400 and/or functionalities thereof can be integrated into the warehouse management system (and/or modeled/simulated by the warehouse management system). For example, the motion planner 400 can determine robot routing/paths as part of a joint optimization of target payload position(s) and robot path(s) (e.g., using the set of models). Alternatively, the motion planner 400 can determine robot routes using model-based approaches, independently of the warehouse management system (e.g., where the models can be the same or different). The motion planner 400 can include processing and/or processing modules which can be: local (e.g., onboard the robot, proximal the cell grid structure, etc.), remote (e.g., at a remote server, at a third party server, cloud processing, etc.), centralized, distributed, and/or otherwise executed. The motion planner 400 preferably manages the current state within a unified database/repository (e.g., maintaining redundancy and/or concurrency) and/or other data storage system. In a complete loss of power and/or communications at the motion planner 400 (e.g., total power outage), the existing reservations remain, thereby maintaining belief state awareness. The motion planner 400 is preferably communicatively connected to the warehouse management system 500 and robots 200, but can additionally or alternatively be communicatively connected to any other suitable components. In a variant, the motion planner 400 can be the "motion planner" described in U.S. application Ser. No. 18/964,303, filed 29 Nov. 2024, which is incorporated herein in its entirety by this reference.

However, the motion planner 400 may be otherwise configured.

Figure 9:
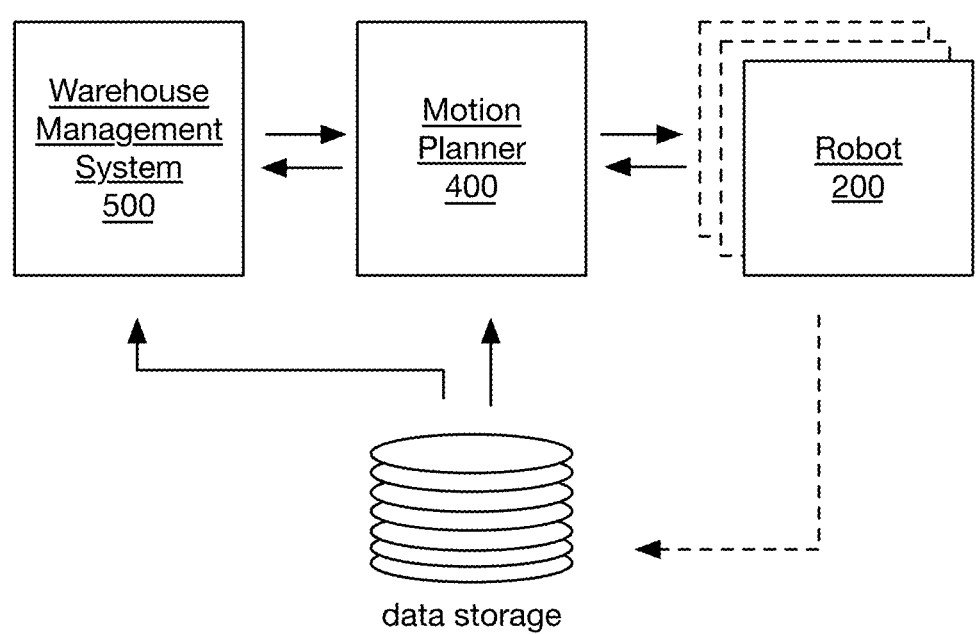
FIG. 9 is a schematic representation of a variant of communication paths between system components.

The system can optionally include or operate in conjunction with a warehouse management system 500. The warehouse management system 500 can function to determine a target state of the warehouse (i.e., target cell position for each payload and/or cell tray within the warehouse). For example, the warehouse management system 500 can function to determine a target position/cell (e.g., a payload storage cell) for an (indexed) payload entering the system, which can be provided to the motion planner to control robot motion and/or placement of the payload (e.g., cell tray and/or a pallet housed thereon) at the target position (e.g., target cell within the cell frame). Additionally, the warehouse management system 500 can manage/direct dynamic rearrangement (a.k.a., reshuffling) of payloads based on the target state. For example, updates to the target state may direct actions/movements by one or more robots in order to improve the likelihood/probability of shorter retrieval distances, reduce the spatial density of payloads within the system, and/or reduce obstructions for future retrievals. The warehouse management system 500 can perform S300 and/or any other suitable processes. The warehouse management system 500 is preferably communicatively connected with the motion planner 400 (e.g., example shown in FIG. 9), but can alternatively be otherwise connected with the motion planner 400. The warehouse management system 500 preferably includes a set of models and/or algorithms executed at a processing system local to the warehouse, but can alternatively be executed remotely. The processing system executing the warehouse management system 500 can be onboard a robot or separate from a robot. In a variant, the warehouse management system 500 can be the "warehouse management system" described in U.S. application Ser. No. 18/964,303, filed 29 Nov. 2024, which is incorporated herein in its entirety by this reference.

However, the system can include any other suitable components.

4. Method

As shown in FIG. 1, the method can include: optionally receiving a payload S100; optionally validating a system state S200; determining a target state S300; and determining a set of operations S400. The method functions to manage payloads stored within a grid-based structural system. The method can be performed when: a payload is added to the system, a payload is removed from the system, a payload is transferred within the system, and/or any other payload operation. The method can be performed by: the robot, motion planner, warehouse management system, and/or any other suitable system components.

The method can optionally include receiving a payload S100, which functions to receive a payload for ingress into the cell frame structure. S100 is performed when: material handling equipment (e.g., a forklift, etc.) deposits a payload onto a cell tray (e.g., a cell tray in the first position, a cell tray in the second position, etc.), or when a user and/or automated system sends a payload ingress command to the warehouse management system, motion planner, and/or robot. S100 is repeated when new payloads are added to the cell frame structure and/or any other appropriate time. S100 is preferably performed at a transfer cell, but can alternatively be performed at another suitable cell. S100 is preferably performed by a robot carrying a cell tray, but can alternatively be performed by a robot without a cell tray, a cell tray supported by a set of supports of the transfer cell, another suitable system component or set of system components, and/or any other component. S100 can include the material handling equipment depositing the payload at the center of the cell tray (e.g., such that the center of mass of the payload/cell tray system is at the center of the robot during a cell tray pickup operation), offset from a center of the cell tray (e.g., such that the center of mass of the payload/cell tray system is offset from a central vertical axis of the robot during the cell tray pickup operation by 1 inch, 2 inches, 6 inches, 8 inches, 12 inches, 16 inches, a distance within an open or closed range bounded by the aforementioned values, and/or any other suitable distance). In a first variant of S100, a robot carrying a cell tray receives the payload and/or pallet carrying the payload. In a second variant, a robot without a cell tray receives the payload and/or pallet on top of a cell tray. In a third variant, a robot can receive the payload and/or pallet directly, without an intervening cell tray. However, a cell tray can otherwise be used or not used.

However, receiving a payload S100 may be otherwise performed.

The method can optionally include validating a system state S200, which functions to ensure that a payload and/or cell tray is suitable for traversal and/or storage within the system. In an example, S200 can include capturing a set of measurements of the payload, determining a set of morphometric parameters of the payload based on the set of measurements, and comparing the morphometric parameters with geometric constraints of the 3D frame in order to validate that the payload is in condition for storage within the cell frame structure. S200 can be performed at a processing system (e.g., by a processing system of the robot, a processing system executing the warehouse management system and/or the motion planner, etc.).

In a first variant, validating a system state S200 can be performed while the cell tray (e.g., a cell tray carrying a received payload, etc.) is at the first position in the transfer cell. In a second variant, validating a system state S200 can be performed while the cell tray is at the second position in the transfer cell. In an example, motion of the cell tray between the second position and the first position is conditioned on validation of the system state. In a third variant, validating a system state S200 can be performed while the robot is moving the cell tray from the first position in the transfer cell to a second position in the transfer cell. In a fourth variant, S200 can be performed while the material handling equipment is still supporting the payload (e.g., directly above the cell tray, etc.) or is able to pick up the payload (e.g., while forks of the forklift are within holes of a pallet, etc.), and responsive to S200, a notification can be sent to the material handling equipment or operator thereof (e.g., a green light, etc.) that the payload and/or pallet thereon is within a set of X-Y and/or optionally Z constraints. In an example of this variant, where a forklift is automatically controlled, the system (e.g., warehouse management system, etc.) can control the forklift to disengage from the payload only after payload validation. However, S200 can alternatively be performed while the cell tray is in another suitable position.

The system state in S200 can refer to a state of a single received payload (e.g., at the transfer cell) and/or cell tray thereon, a state of multiple payloads, and/or a state of any other suitable number of payloads and/or cell trays within the cell frame. System state in S200 can refer to, for the robot, cell tray, and/or payload: morphometric parameters such as a set of dimensions (e.g., dimensions in the X, Y, and/or Z dimensions, etc.), a position (e.g., in X, Y, and/or Z, etc.), an envelope mesh, a volume, a minimum distance between the payload and/or cell tray and a cell envelope, a distance between the payload and/or cell tray and a boundary of a clearance corridor, and/or any other distance parameter), a weight, a center of mass location (e.g., in X, Y, and/or Z, etc.), a base-to-height ratio, a settling time, a critical angle before tip-over, a stability factor, a 2D or 3D weight distribution, and/or any other morphometric parameters of the robot, payload, and/or cell tray. S200 is preferably performed using a processing system (e.g., onboard a robot, executing the warehouse management system, motion planner, etc.) and/or a set of sensors (e.g., sensors mounted to the robot, sensors mounted to the cell frame structure, sensors mounted to the transfer cell, etc.). S200 can include use of visual sensors (e.g., cameras, stereocameras, line laser scanners, lidar scanners, photogrammetry arrays, interferometry systems, laser displacement sensors, thermal imaging sensors, etc.), contact-based sensors (e.g., load cells, force sensors, torque sensors, pressure mapping arrays, etc.), and/or sensors of any other suitable type. In variants, S200 can include comparing the morphometric parameters of the payload and/or cell tray to a predetermined or dynamically determined threshold value (e.g., maximum weight, maximum dimensions, etc.) in order to determine whether a payload and/or cell tray can be moved through the system by the robot (e.g., whether the robot can handle kinematic effects associated with the morphometric parameters, etc.), whether a payload can physically fit within the cell, whether a payload can physically fit within clearance corridors of the set of clearance corridors (e.g., satisfying dimensional constrains), and/or whether the payload meets any other suitable morphometric or kinematic condition(s). In variants, S200 can include, based on the morphometric parameters, determining a set of traversal constraints (e.g., which cells are accessible, at what speed the robot can traverse the cell frame structure in the X, Y, and/or Z directions, etc.). In a first example, S200 can include, at a plurality of load cells at each robot alignment feature, determining a force due to the payload, calculating an overall mass and/or a center of mass of the payload, and validating that the mass and/or center of mass of the payload fall within a predetermined range. In a second example, S200 can include, at a set of sensors mounted to the cell frame structure, capturing a set of images and/or 3D scans of the payload and/or cell tray, determining a set of morphometric parameters of the payload and/or cell tray (e.g., envelope dimensions, volume, etc.), and validating that the morphometric parameters fall within a predetermined range.

However, validating a system state S200 may be otherwise performed.

Determining a target state S300 functions to determine a target state for payloads within the cell frame structure. S300 is preferably performed by the warehouse management system, but can additionally/alternatively be performed by other suitable system components (e.g., a processing system of the robot, the motion planner, etc.). S300 can refer to a target state of all payloads within the cell frame structure, a target state for a subset of payloads within the cell frame structure, or a target state for a received payload (e.g., at the transfer cell, etc.). In a variant, S300 can be performed concurrently with S400 (e.g., determining a set of operations), in a variant where a target state is determined based on the operations required to reach each of a set of candidate target states (e.g., a target state is robot path-specific). The target state for S300 preferably includes a target location (e.g., coordinate position within the three-dimensional rectilinear grid) and/or grid cell for each payload, cell tray, and/or each robot, but can additionally or alternatively include status information (e.g., whether a payload is coupled to/decoupled from a robot), robot configuration, a set of target actions (e.g., robot paths), and/or any other suitable information. S300 preferably determines the target state based on a set of inputs, such as the current state estimate (i.e., belief state). The current state estimate can include locations and/or morphometric parameters of cell trays and/or payloads thereon within the cell frame structure, a number of available cell trays within the cell frame structure (e.g., within a cell tray storage cell, etc.), a number and/or position of robots within the cell frame structure, and/or any other suitable information. In variants, the current state estimate can include and/or be determined based on belief state parameters (e.g., a prior state estimate from a motion planner from n−1 timestep; robot locations based on feedback from robots; payload positions stored in memory and/or detected by perception, etc.), feedback from the motion planner, manual inputs at the user interface (e.g., user requests to retrieve a payload based on the index; user request to store a payload), automatic/autonomous determinations at a robot (e.g., receipt of a new payload at an transfer cell in S100), payload retrieval requests, payload storage requests, payload attributes (e.g., payload classification, weight, induction/receipt location, planned output location, identifying information, recipient, customer/application specific payload parameters, etc.), customer data (e.g., a schedule, a retrieval queue, an insertion queue, customer order/tracking information, etc.). The set of inputs for S300 can additionally include physics models/controllers and/or motion constraints for the robot (e.g., max traversal rate/acceleration in each axis, which may be a function of payload weight; predetermined/estimated time period of configuration and/or direction changes; etc.), and/or any other suitable input(s). Additionally, the set of inputs and/or target state can be determined based on the physical constraints of the structure (e.g., predetermined/predefined via the user interface and/or during initialization of the system). For example, the structure can be defined relative to a set of (indexed) nodes/cells and/or indexed edges (e.g., three-dimensional rectilinear grid connections between adjacent nodes/cells along each axis of the frame). However, it is understood that the system and/or structural constraints can be otherwise suitably defined (e.g., relative to boundaries, bounding boxes, etc.). However, the target state can be otherwise determined based on any other suitable set of input(s)/parameter(s) from any suitable source(s). S300 can optionally be determined based on a payload retrieval protocol. In a first example, the payload retrieval protocol can include a set of rules defining an order in which payloads are received (e.g., first-in-first out, last-in-first out, priority-based ordering, shortest job first, random access, most recently used, weighted fair queuing, etc.). In a second example, the payload retrieval protocol can be based on a set of payload-specific parameters (e.g., a payload expiration date, a payload retrieval deadline, a current condition of the payload, etc.). The payload-specific parameters can be predetermined, determined during payload ingress (e.g., when the payload is validated), dynamically-determined during storage, and/or otherwise determined. In a third example, the payload retrieval protocol can be based on system optimization criteria (e.g., minimizing retrieval time, maximizing storage density, balancing wear across storage mechanisms, optimizing energy consumption, reducing system congestion, or maintaining target throughput rates). In a fourth example, the payload retrieval protocol can incorporate external factors (e.g., shipping schedules, customer requests, inventory management directives, seasonal demand patterns, or integration with external warehouse management systems). S300 can include a payload retrieval protocol that can be otherwise defined. In a first example, S300 includes determining a target state for a payload and/or cell tray currently stored within a payload storage cell (e.g., wherein the target state is at the transfer cell, at a position outside the cell frame structure, etc.) In a second example, S300 includes determining a target state for a payload and/or cell tray at a transfer cell (e.g., wherein the target state is at a payload storage cell, a cell tray storage cell, etc.) In a third example, S300 includes determining a target state for a cell tray at a cell tray storage cell (e.g., wherein the target state is at a transfer cell, to receive a payload; etc.). In variants, S300 can be performed using any of the methods performed by the "warehouse automation system" described in U.S. application Ser. No. 18/964,303, filed 29 Nov. 2024, which is incorporated herein in its entirety by this reference.

However, determining a target state S300 may be otherwise performed.

Determining a set of operations S400 functions to direct robots within the cell frame structure. S400 is preferably performed by the motion planner, but can additionally and/or alternatively be performed by any other suitable system component. In variants, S400 can be performed using any of the methods performed by the "motion planner" described in U.S. application Ser. No. 18/964,303, filed 29 Nov. 2024, which is incorporated herein in its entirety by this reference. S400 preferably includes determining a set of operations for the system and/or components thereof (e.g., cell tray, robot, payload, etc.) to reach a target state (e.g., determined in S300). S400 operations can refer to actions performed by the robot, cell tray, processing system, set of sensors, and/or any other system component.

In a first example, an operation for S400 is to pick up a cell tray. In this example, the operation can optionally include aligning the robot and the cell tray (e.g., to make sure robot alignment features and cell tray alignment features are within a threshold distance of each other) and/or lifting a superior surface of the robot relative to a robot chassis (e.g., using a linear actuator, etc.) and/or lifting a robot itself (e.g., using the helical drive). In this example, aligning the robot and the cell tray can include capturing a visual feature (e.g., QR code, etc.) on the cell tray using a camera on the robot, capturing a set of depth measurements of the cell tray from the robot, and/or any other suitable alignment mechanism. Optionally the operation in this example can include engaging with a set of dynamic supports of the cell to push them back into place (e.g., to facilitate vertical motion of the cell tray through the cell, etc.) However, the operation to pick up a tray can be otherwise defined.

In a second example, the operation for S400 is to traverse the cell frame structure (e.g., traverse the cell frame structure through clearance corridors, etc.). In this example, the operation can include traversing the cell frame structure in the X-direction, Y-direction, Z-direction, and/or any other suitable direction or combination of directions. In this example, the operation can include traversing a single cell, crossing between cells, traversing only a portion of a cell (e.g., until a point offset from a center of a cell), traversing multiple cells in a single operation (e.g., without stopping), and/or any other suitable types of traversal. However, the operation to traverse the cell frame structure can be otherwise defined.

In a third example, an operation for S400 can include switching directions. In this example, the operation can include engaging and/or disengaging traversal drivers from the cell frame structure (e.g., helical end effectors, and/or drives, wheels and/or other traversal drivers for motion in the Z direction, wheels and/or other traversal drivers for motion in the X and/or Y direction, etc.). In a specific example, switching from motion in the Y-direction to motion in the Z-direction can include engaging helical drives with a set of four columns at each corner of a cell. However, the operation to switch directions can be otherwise defined.

In a fourth example, an operation can include depositing a cell tray. In this example, the operation can optionally include aligning the robot and/or subcomponents thereof with a set of static and/or dynamic supports of a cell; optionally engaging with (e.g., using the cell tray and/or a hook on the robot, etc.) a set of dynamic supports (e.g., to activate the dynamic supports by pulling them away from frame members of the cell frame structure, etc.); optionally lowering a superior surface of the robot relative to the robot chassis (e.g., using a linear actuator, etc.) and/or lowering the robot itself (e.g., via the helical drive, etc.). In a specific example, the operation to deposit the cell tray can include depositing the cell tray in a group (e.g., stack, etc.) of cell trays within a cell tray storage cell. However, the operation to deposit a cell tray can be otherwise defined. In a fifth example, the S400 operation can include adjusting a position of the cell tray (e.g., at the transfer cell, etc.).

In this fifth example, the operation can include engaging with the cell tray at the cell tray alignment features, partially traversing a cell tray (e.g., 10% the width of the cell in a direction of traversal, 20%, 30%, 40%, 50%, 60%, within an open or closed range bounded by the aforementioned values, and/or any other suitable width), and depositing the cell tray at a distinct position from the position from which the cell tray was lifted. In a specific example, this operation can be performed at the transfer cell and can adjust a position of the cell tray from the first position to the second position. In a second specific example, this operation can include clearing a cell for traversal by another robot by moving a cell tray partially within the cell to a position fully outside of the cell. The payload can be received (e.g., from material handling equipment, etc.) while the cell tray is at the second position.

In a sixth example, the operation can include validation of the payload and/or cell tray (e.g., using methods described in S200, etc.). In this example, the operation can include capturing a set of sensor measurements of the payload and/or cell tray (e.g., load cell force measurements, camera measurements, etc.) to determine morphometric parameters of the payload. In this example, the operation can function to validate that the payload is secure on top of the cell tray, to validate that the payload can fit through a next section of the cell frame structure, and/or to validate any other attribute of the payload and/or cell tray. In this example, the validation operation can be performed while the robot is moving, while the robot is stationary, and/or at any other suitable time. In this example, the validation operation can optionally be performed concurrently with another operation.

The set of operations S400 can include a plurality of operations in sequence, in parallel, and/or with any other temporal or functional relationship. In variants where the set of operations includes multiple traversal operations in series, S400 can define a minimum traversal distance or a non-minimal traversal distance. In an example, the traversal operation between a transfer cell and a payload storage cell above the transfer cell (e.g., vertically aligned with the transfer cell) can include, in series, a y-direction traversal, a z direction traversal, a y-direction traversal (e.g., equal and opposite to the first y-direction traversal), and/or traversals in any other suitable direction. In another example, the traversal operation can include traversing the cell frame structure to a line of cells (e.g., a row, a column, etc.) temporarily or permanently designated for traversal (e.g., an "elevator" column, etc.). In such examples, the path between cells can be indirect. In variants, a number of traversal operations in a given direction (e.g., X, Y, or Z, etc.) for S400 can include 0, 1, 2, 3, 5, 10, a number of traversal operations within an open or closed range bounded by the aforementioned values, and/or any other suitable number of traversal operations.

Transitions between operations in S400 can be defined based on temporal conditions (e.g., traverse for X seconds, then switch directions, etc.), position conditions (e.g., traverse until the robot reaches point [A,B] within cell C), observation condition (e.g., traverse at speed X until the robot detects a QR code indicating that the robot should switch to a lower or higher speed Y; traverse at speed X until the robot detects another robot in its path, then switch to a lower or higher speed Y, etc.), emergency conditions (e.g., traverse until a robot-specific or cell frame structure-specific emergency condition is detected, such as a stalled robot, etc.), and/or any other suitable condition or set of conditions.

However, determining a set of operations S400 may be otherwise performed.

The method can optionally include implementing the set of operations S500 (e.g., with the robot 200). S500 can include moving a cell tray and/or payload through the cell frame structure. S500 can include implementing operations to pick up a cell tray, traverse the cell frame structure, switch directions, depositing a cell tray, adjusting a position of the cell tray, validating the payload and/or cell tray, and/or any other suitable operation. S500 is preferably performed by the robot, but can additionally or alternatively be performed by other system components (e.g., a set of sensors on the cell frame structure, etc.). S500 can be performed after S400, concurrently with S400 (e.g., wherein the set of operations are dynamically determined during execution, etc.), and/or at any other suitable time.

Figure 3A:
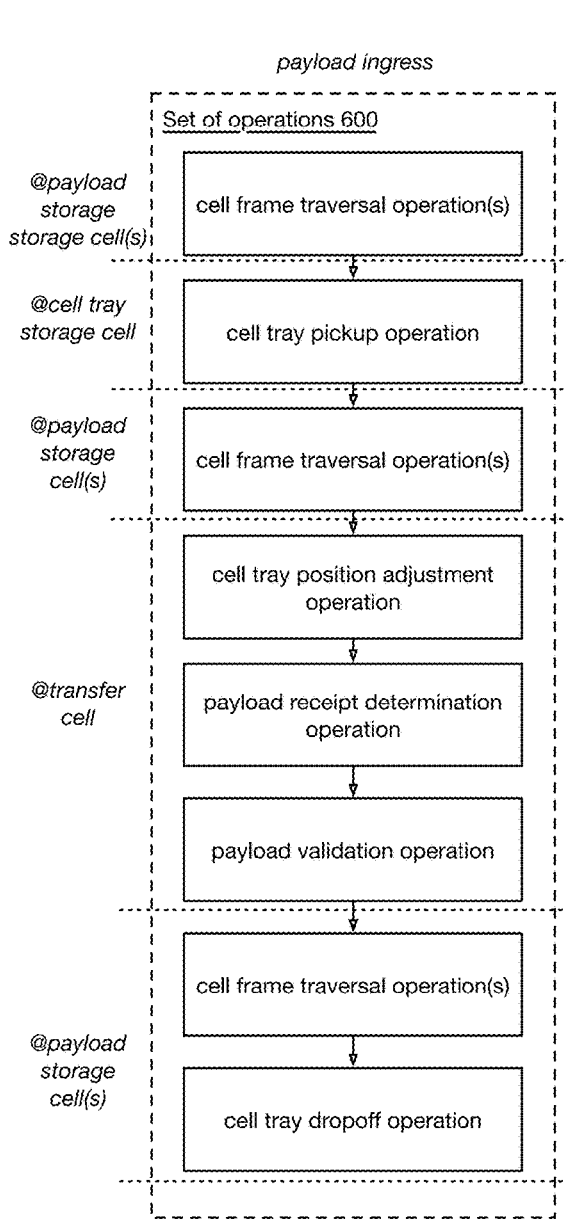
FIGS. 3A-3B are examples of variants of sets of operations.

In a first example (e.g., example shown in FIG. 3A, etc.), S500 can include, responsive to a request to deposit a payload within the cell frame structure, sending a robot to traverse the cell frame structure to the cell tray storage cell, retrieve a cell tray, traverse the cell frame structure to the transfer cell, adjust the position of the cell tray from the first position to the second position within the transfer cell, receive the payload while the cell tray is at the second position, detect receipt of the payload (e.g., based on user confirmation, robot load cell measurements, a visual observation from images captured by sensors on the robot and/or the cell frame structure, a departure of material handling equipment, etc.), validating the payload, adjusting the position of the cell tray from the second position to a first position within the cell, traversing the cell frame structure to a target cell (e.g., a payload storage cell, etc.), depositing the cell tray with the payload at the target cell, and disengaging with the cell tray.

Figure 3B:
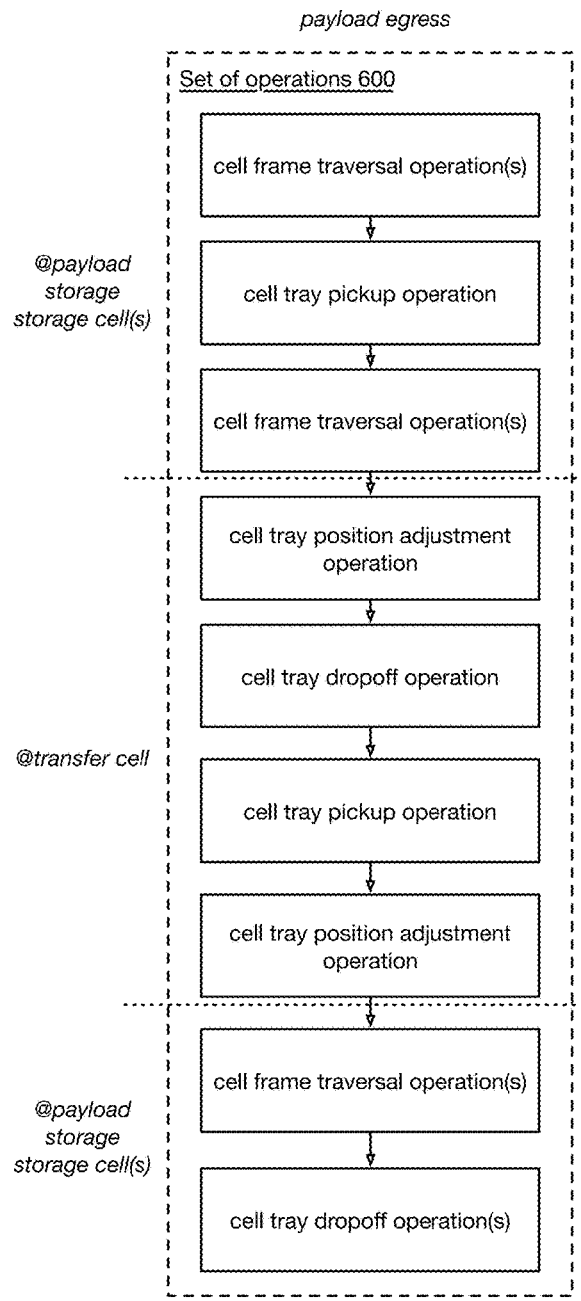

In a second example (e.g., example shown in FIG. 3B, etc.), non-exclusive with the first example, S500 can include, responsive to a request to retrieve a payload from the cell frame structure (e.g., wherein the request is specific to a particular payload or generic to payloads of a particular type, etc.), traversing the cell frame structure to a payload storage cell, lifting the cell tray off of a set of supports of the cell, traversing the cell frame structure to a transfer cell, adjusting a position of the cell tray to a second position, detecting retrieval of the payload by material handling equipment, adjusting a position of the empty cell tray, and sending the robot to a cell tray storage cell to deposit the empty cell tray. In examples, when implementing S500, a payload can enter the cell frame structure (e.g., during ingress) via a first path which includes a first series of intermediate cells and leave the cell frame structure (e.g., during egress) via a second path which includes a second series of intermediate cells which is wholly or partially disjoint with the first series of intermediate cells. Alternatively, the payload can enter and leave the cell frame structure via the same path.

In examples, when implementing S500, a payload can enter the cell frame structure supported by a first robot and can leave the cell frame structure supported by a second robot distinct from the first robot. Alternatively, the same robots can perform ingress versus egress. In examples, S500 can include different robots performing different segments of an ingress and/or egress operation (e.g., wherein a cell tray is deposited at an intermediate cell along the ingress/egress pathway, etc.). However, a single robot can alternatively perform ingress and/or egress. In examples, when implementing S500, a target cell to which a payload is delivered can be above (e.g., vertically aligned with or not aligned with) a transfer cell in which the payload is deposited for ingress. In such examples, the pathway between the transfer cell and the target cell can be a vertical line, but can alternatively be a combination of segments parallel with the X, Y, and/or Z axes. (e.g., a first horizontal segment, a vertical segment, and a second horizontal segment equal and opposite to the first horizontal segment; etc.)

All or portions of the method can be performed in real time (e.g., responsive to a request), iteratively, concurrently, asynchronously, periodically, and/or at any other suitable time. All or portions of the method can be performed automatically, manually (e.g., responsive to a manual user request via a user interface, API, etc.), semi-automatically, and/or otherwise performed.

All or portions of the method can be performed by one or more components of the system, using a computing system, using a database (e.g., a system database, a third-party database, etc.), by a user, and/or by any other suitable system. The computing system can include one or more: CPUs, GPUs, custom FPGA/ASICS, microprocessors, servers, cloud computing, and/or any other suitable components. The computing system can be local, remote, distributed, or otherwise arranged relative to any other system or module.

Different subsystems and/or modules discussed above can be operated and controlled by the same or different entities. In the latter variants, different subsystems can communicate via: APIs (e.g., using API requests and responses, API keys, etc.), requests, and/or other communication channels.

The present disclosure addresses the aforementioned problems by increasing possible pathways for storing and/or retrieving items or parts in a multi-level rack, especially for storing and/or retrieving the items or parts that are located in the inner parts of the rack that may be blocked by the outer parts of items or parts along the possible horizontal or vertical pathways. The present disclosure achieves this by introducing an automated storage and retrieval machine that itself can move both horizontally and vertically within the rack without necessarily relying on additional lift facilities or stacker cranes. If a unit in the rack for storing a pallet or tray with loaded parts or items (together or individually also referred to as "payload" hereinafter) is considered as a cell and the rack is considered as matrix, the introduced automated storage and retrieval machine can move in six different directions from an inner cell (e.g., in two directions along each of three axes), to achieve a cell-to-cell three dimensional (3D) navigation within the matrix, instead of merely two dimensional movements as other automated storage and retrieval machines. For ease of interpretation, the automated storage and retrieval machine disclosed herein can be also referred to as "material handling robot" or simply "robot" throughout the description.

Figure 6A:
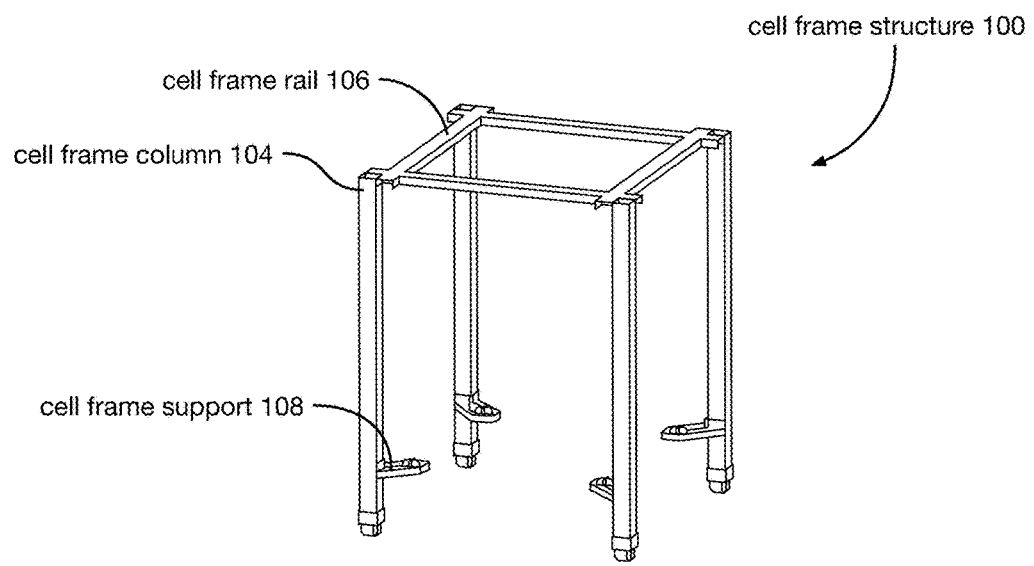
FIGS. 6A and 6B are a first and second example of a cell frame structure module and a cell frame structure assembly, respectively.
Figure 6B:
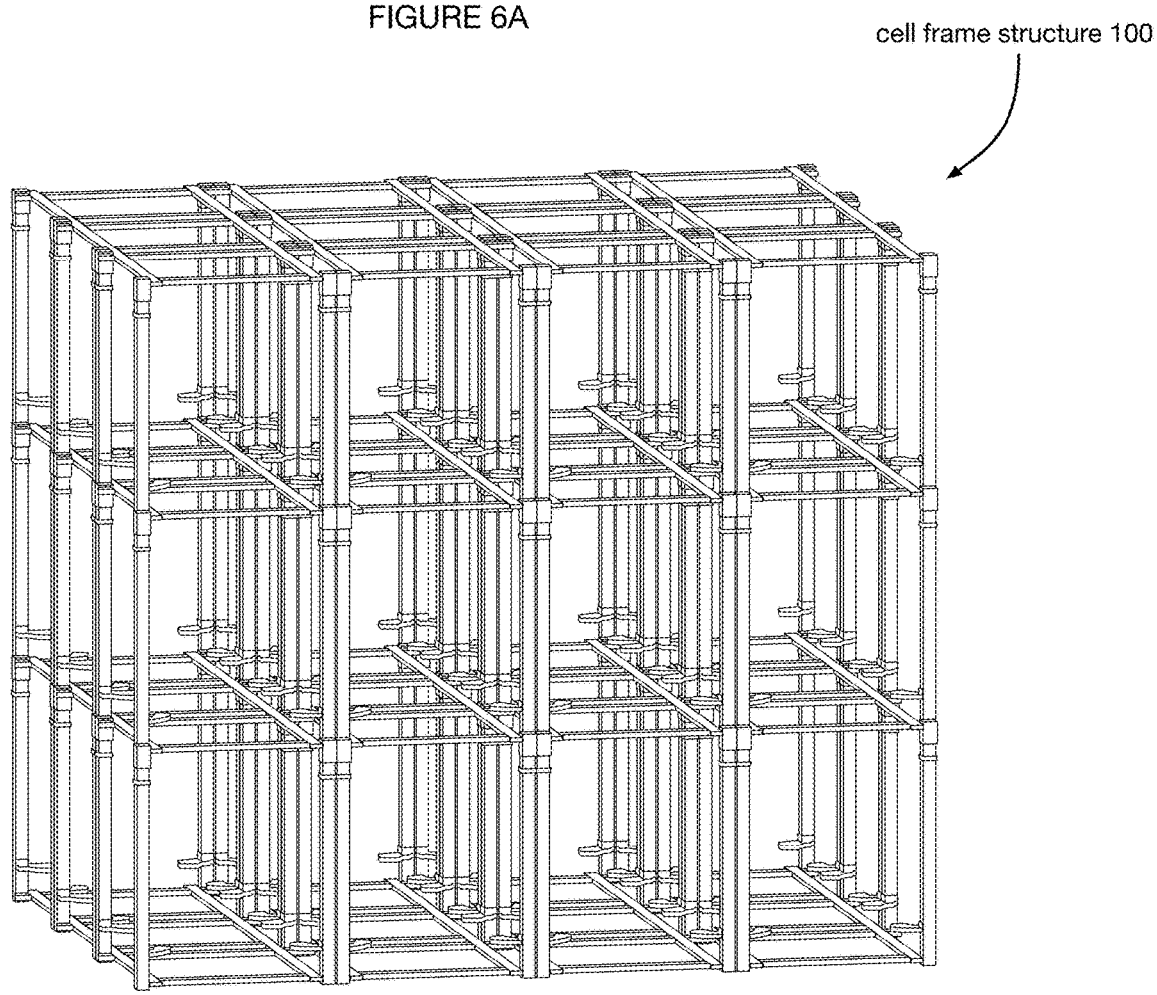

FIGS. 6A and 6B illustrate example architecture of a multi-level rack and a cell included therein, according to some embodiments. Specifically, FIG. 6B is an exemplary multi-level cell frame structure (e.g., multi-level rack) 100 that is 3 cells deep, 4 cells wide, and 3 cells tall, and FIG. 6A illustrates an example cell included in the multi-level rack. As illustrated, the cell is constructed using four columns 104 and four nodes to make connections between columns, and four rails 106 connecting the columns Also shown in FIG. 6A are four cell frame supports 108 attached to the columns for securing a payload in storage. A robot can move freely thereunder along a horizontal direction after unloading the stored payload.

Figure 7A:
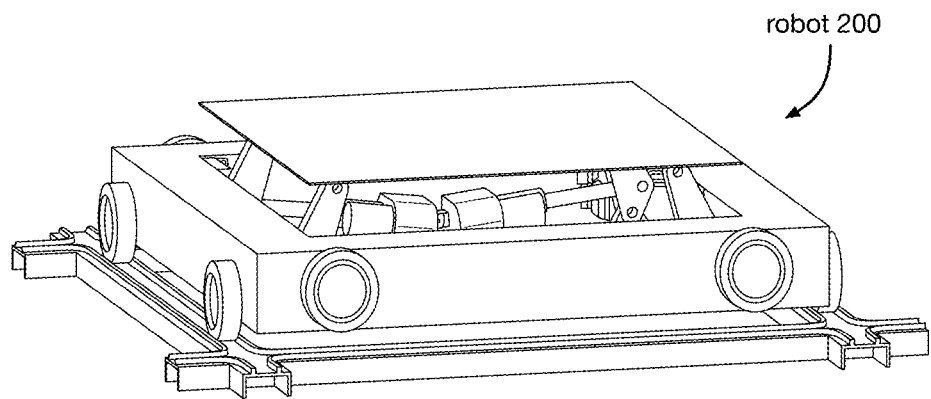
FIGS. 7A-7B are examples of a variant of a robot.
Figure 7B:
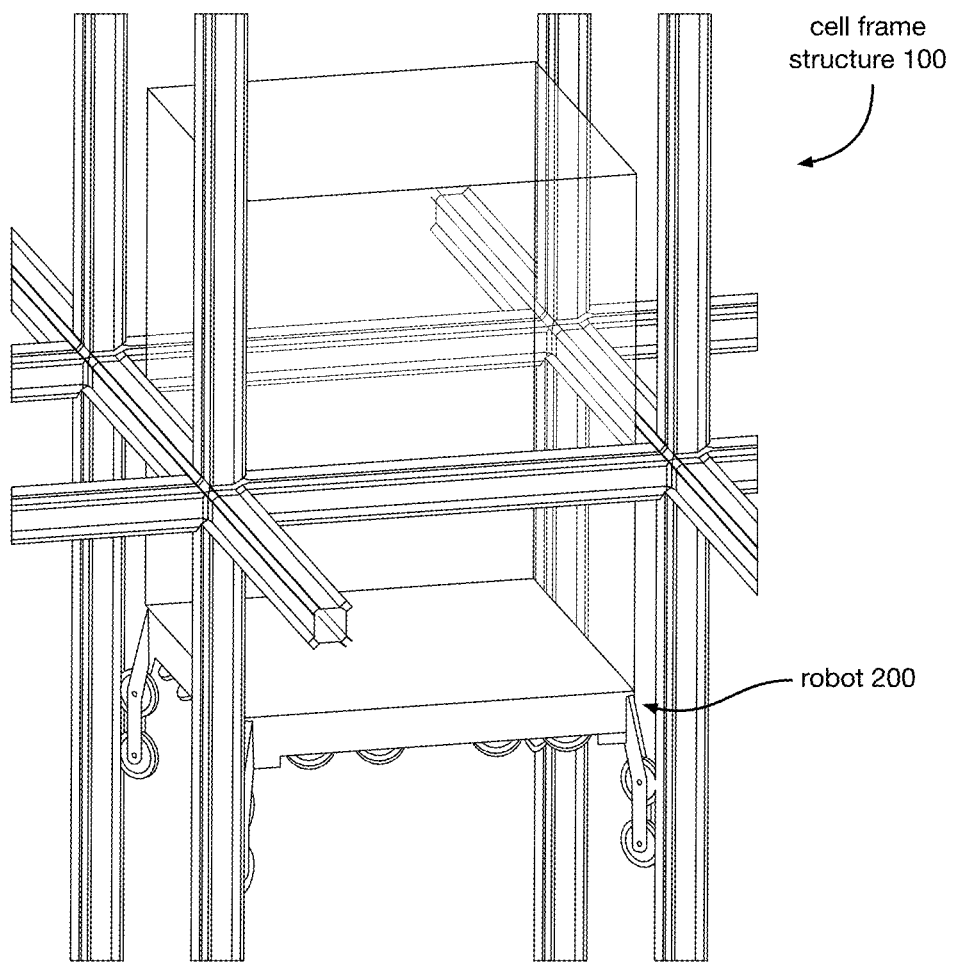

FIGS. 7A and 7B illustrate mechanisms for moving a robot horizontally and vertically to achieve a 3D cell-to-cell navigation, according to some embodiments. Briefly, a robot disclosed herein may include a different set of wheels that are configured to allow the robot to move along different directions in a 3D environment. Specifically, FIG. 7A illustrates an exemplary robot 200 that is captive and traveling horizontally on wheels on structural rails, according to one embodiment. The robot travels on rail features (e.g., grooves or tracks) built into the structural beams on the horizontal axis. The robot can travel on top of the rails with the beams having a retaining feature forming a track for the wheels. Wheels include different types of sets that are actuated (e.g., engaged and disengaged) depending on the direction of travel, so only wheels (e.g., wheels) in the direction of travel are engaged. Unused wheel sets (e.g., wheels) are retracted in a position to provide clearance so as not to hinder or interfere with the movement of the robot along a specific direction in a 3D cell-to-cell navigation. FIG. 7B illustrates an exemplary robot that has deployed Z wheels to achieve a vertical movement, according to one embodiment. In the illustrated embodiment, the robot deploys vertical-travel wheels (e.g., wheels) to translate along the Z-axis using an actuator to rotate the climbing wheels into position. Positive forces use traction between the robot wheels and columns to control descent. It should be noted that the mechanisms illustrated in FIGS. 7A and 7B are merely for exemplary purposes, and the robots disclosed herein may employ other different mechanisms to achieve the similar 3D cell-to-cell navigation.

In applications, by enabling a robot to move along a vertical direction, the possible pathways for storing and/or retrieving a payload can be greatly increased, especially when considering the possible pathways that can be built up through vertical movements along the possible paths. This then increases the possible storage capacity (storing in an inner cell that may be horizontally blocked by outer payloads) and/or efficiency (e.g., without necessarily moving away certain other payloads to retrieve an inner payload) of a multi-level storage facility. In the following, certain example application scenarios are further described to illustrate the increased pathways introduced through the horizontal and vertical movements of a robot disclosed herein.

Figure 10A:
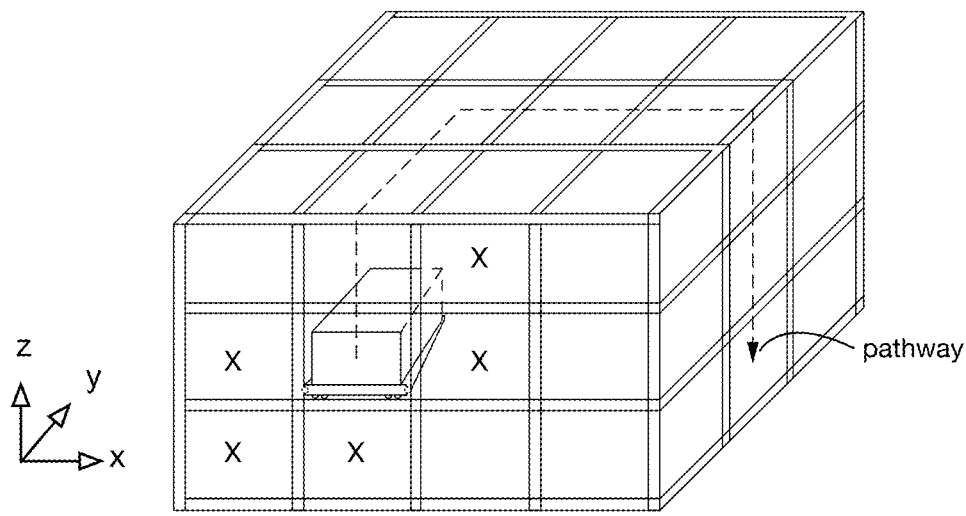
FIGS. 10A-10B are illustrative examples of pathways of cell frame structure traversal.
Figure 10B:
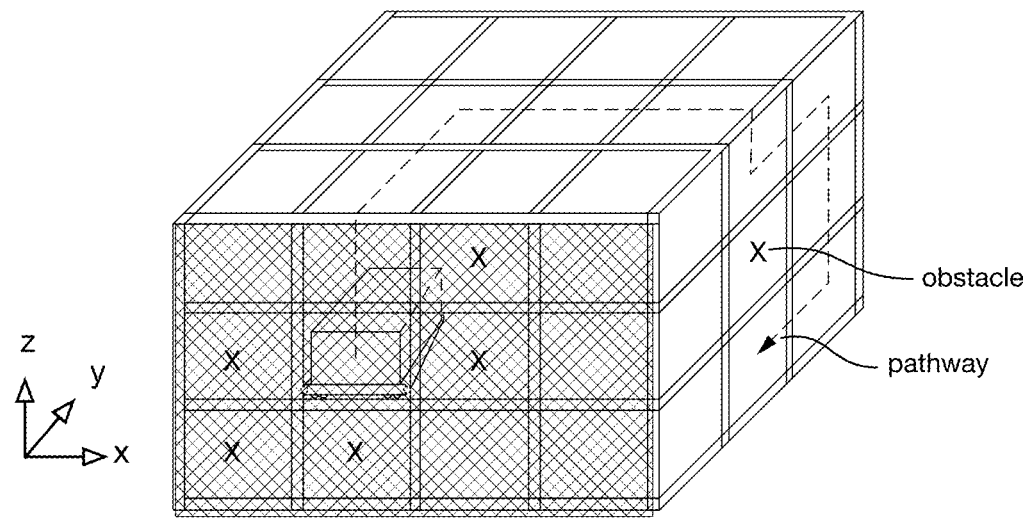

In one example application scenario, if there is no other payload within the illustrated facility, the robot may choose one of the shortest pathways to move the payload from a first cell to a second cell. In an example application scenario, if there are multiple payloads blocking the pathway, as indicated by "x" in FIG. 5A. At this point, another different pathways may be selected which includes a first vertical movement, followed by three horizontal movements then by two vertical movements again. In yet another example application scenario, if an additional payload in the cell blocks the pathway, a new pathway (e.g., as in FIG. 10A and FIG. 10B) can be selected, which still allows the robot to move from the first cell to the second cell. It should be noted that in the above example application scenarios, the pathways are just example pathways. Some alternative pathways are also possible in each application scenario.

As can be seen from the above example scenarios, the 3D cell-to-cell navigation greatly increases the possible pathways to move a payload within a storage facility, among which, many pathways may be not possible for other existing automated storage and retrieval systems. For example if there is a wall on the front side of the cell and if there is another payload stored on the backside of the cell, then the payload in the cell in the existing automated storage and retrieval systems cannot be moved, since there is no horizontal movement available for moving the payload in the cell. In addition, since there is a wall, a crane is not able to reach the payload in the cell, either. Accordingly, to move the payload in the cell, one or more payloads in the neighbor cells (and/or some farther cells) need to moved away first, which then increases the time and resources to move away these payloads before moving the payload in the cell.

In some embodiments, the robot disclosed here operates under computerized control. For example, the robot disclosed herein may be communicated with through a centralized computer (e.g., a server), which may be configured to determine available pathways and one of the best pathways based on the ranking of each pathway. In one example, the centralized computer or server includes a specific application configured to determine different pathways for a robot. For example, to determine possible pathways for moving a robot from a first cell to a second cell, the application may start by checking each neighbor cell of the first cell and determine whether each neighbor cell contains a pallet or not (i.e., free for passing or not). A neighbor cell can be any of the possible six neighbor cells in a 3D environment. After identifying a neighbor cell that is available for passing through, a pathway may start to build. Ideally, there may be six pathways to start with, depending on how many neighbor cells the first cell has and whether each neighbor cell is available to pass through. For each built pathway, it may continue to extend and/or expand (to multiple pathways) after checking the new neighbor cells of a neighbor cell of the first cell. The application may continue to extend and/or expand each likely pathway, until a pathway reaches the second cell to become an actual possible pathway for moving a payload from the first cell to the second cell. The application may eventually identify a plurality of likely pathways through the process, where each pathway may have different lengths and routes.

In some embodiments, the application may determine a most proper pathway out of many possible pathways for a selected robot. For example, the application may determine time and energy required (for moving the payload by the robot) for each pathway. A weighted score can be then determined for each pathway, where the weights for time and energy may be predefined and/or dynamically adjusted (e.g., time has a larger weight in the busy hours and a lower weight when it is not so busy). In some embodiments, additional factors such as safety or risk may be also considered in pathway ranking. For example, frequent vertical movements may cause certain shaking of items over a pallet, and thus the weight for vertical movements may have a lower weight in pathway ranking. After determining the weighted score for each possible pathway, a top ranked pathway may be selected for the robot to move a payload from the first cell to the second cell.

In some applications, there are multiple robots that operate within the same storage facility, and there may also be multiple requests for moving items or parts simultaneously or within a short period of time for a specific facility. Accordingly, in some embodiments, the application included in the centralized computer or server is also referred to as "multi-agent pallet ingress/egress management application," which is configured to manage operations of multiple robots (also referred to as "agents") within a storage facility. In one example, when determining the most proper pathways for each robot, the multi-agent pallet ingress/egress management application may consider possible collisions, and thus a selected pathway for each robot may not necessarily always be the top ranked pathway among the all possible ways for a robot.

In some embodiments, the multi-agent pallet ingress/egress management application may further determine and/or adjust operation parameters such as moving speed, moving direction of each robot at any moment within the storage facility. For example, to avoid likely collisions, when determining the most proper pathway for each robot, the multi-agent pallet ingress/egress management application may also take into consideration possible moving speed, including moving speed in each cell along the pathway to prevent possible collisions.

In another example, to avoid likely collisions, the multi-agent pallet ingress/egress management application may define one or more restriction zones at a time point within the storage facility. A restriction zone is a zone defined by a set of points in which a single robot is allowed at any given time. In other words, once a robot has entered a restriction zone, no other bots are allowed in a respective zone. Any other robot waiting to enter an occupied zone must wait in an area that does not block that robot that is in the occupied restriction zone. It should be noted that the above limitations do not apply to a pallet at a station (e.g., a pick-up/drop-off/moving away/working (e.g., earmarking) station) in a restriction zone (presumably the pallet would be at the end of a restriction zone), as a pallet at a station can exist for an undetermined amount of time.

In some embodiments, the multi-agent ingress/egress management application may further determine proper locations (e.g., stack levels, inner or outer storage) for storing items or parts within a storage facility. For example, to enable better management of item storage and/or retrieval, the multi-agent egress management application may further define different types of storage zones in a storage facility, such as a uniform high density zone, a uniform low density zone, and a non-uniform variable density zone. In a uniform high density zone, a higher density of stored items where items are stored therein. For example, for items that are purposed for long storage, since these items consume space and are not frequently accessed, these items can be stored in higher density (e.g., there are no or limited empty cells within the uniform high density zone). In general, the uniform high density zone is set to a higher and inner area(s) in a storage facility. On the contrary, for items that are purposed for short storage, these items can be stored in the uniform low density zone. By setting such a low density zone, it allows easier access to items or parts stored therein since this zone is more frequently accessed than other zones. In general, the uniform low density zone can be set to a lower and outer area(s) in a storage facility. For a non-uniform variable density zone, it can be used for storage of items that have a large quantity but require frequent access, items that require access that is not so long or so short or access that is unpredictable. In some embodiments, each of the aforementioned zones are predefined, and thus when new items or parts are received, based on the expected storage length, it can be assigned to one of the predefined zones. In some embodiments, one or more predefined zones can be dynamically adjusted. For example, if most items or parts received recently are expected to be stored for a short period of time, then the predefined uniform low density zone can be enlarged, which means that the uniform high density zone and/or non-uniform variable density zone needs to be reduced. In some embodiments, there may be more than three types of zones. For example, based on the expected storage length, there may be four, five, six, seven, eight, or another number of zones that can be defined for a storage facility.

In some embodiments, the multi-agent egress management application further employs artificial intelligence (AI) engine in managing the pallet ingress/egress in a storage facility. For example, one or more machine learning models may be included in the application to predict a likely retrieval time of each item stored in the facility, the information of which can be used to further determine proper locations (e.g., a proper zone) for arrangement of incoming items or parts for storage. For another example, another one or more machine learning models may predict incoming storage/retrieval demands, and make proper adjustment (e.g., moving speeds of robots) in view of likely higher storage/retrieval demands. Additional machine learning models may also predict likely failures of a robot based on the operation parameters so that the robot can be pulled out from operation for maintenance and/or repairment. A reinforcement learning approach to this AI would also enable the application to continuously learn from how the storage facility is operated and utilized and then be able to offer AI optimized storage arrangements and/or become self-optimizing as well as self-operating continuously as the application is used. In some embodiments, the multi-agent egress management application agents further employ an artificial intelligence (AI) reinforcement learning engine that enables the robots to collectively and continuously learn and offer over time self-operating procedures including but not limited to optimized path planning and execution, collision avoidance, collaborative compound unblocking maneuvers, locating an agent's own location (localization), locating stored items, inventory counting and inspection. The use of this agent-level AI allows for removal of a hard dependency on an external planning server and allows for autonomous system operation that enables higher uptime and throughput of the system.

Figure 8:
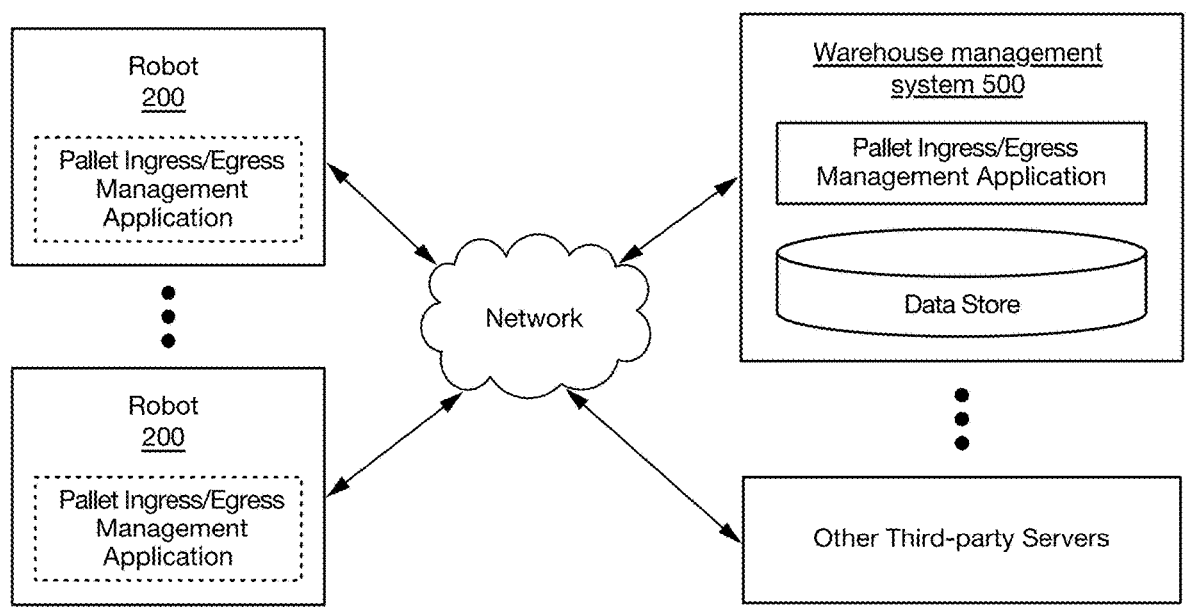
FIG. 8 is a schematic of a variant of a communication network.

FIG. 8 illustrates an example system architecture for implementing the pallet ingress/egress management application, according to some embodiments. In the illustrated embodiment, the pallet ingress/egress management system can take the form of hardware and/or software components running on hardware. For example, in the pallet ingress/egress management system, certain software (e.g., applications or apps, operational instructions, modules, etc.) may be run on a processing device, such as a computer, mobile device (e.g., robot, moving vehicle, shuttle, or Internet of Thing (IoT) devices) and/or any other electronic device. In some embodiments, the components of the pallet ingress/egress management system may be distributed across and executable by multiple devices. For example, location information and/or operation information of a robot may be locally collected (e.g., by one or more sensors) by the robots, which may be transmitted to and processed by other devices (e.g. servers or other robots) in a network.

As illustrated in FIG. 8, a pallet ingress/egress management system may include distributed robots 200 and a server environment comprising one or more servers, including but not limited to robot management server and one or more third-party servers. One skilled in the art will appreciate that the scale of pallet ingress/egress management system may vary and may include additional or fewer components than those illustrated in FIG. 8. In some embodiments, interfacing between components of the pallet ingress/egress management system may occur remotely, for example, where the components of the pallet ingress/egress management system may be distributed across one or more devices of a distributed network.

Robot 200 may be configured to collect and transmit certain operation information of a robot. For example, a robot may include or may be coupled to one or more sensors configured to collect location information and operation parameters such as speeds, moving directions and so on, which can be then transmitted to the warehouse management system 500.

As illustrated in FIG. 8, in some embodiments, a robot may optionally include a respective pallet ingress/egress management application. The robot management server may include a data store for storing robot data and storage items data as well as an instance of pallet ingress/egress management application. The data store and/or the pallet ingress/egress management application may reside on a single server or may be spread across multiple servers, as desired or practical. The robot management server may be implemented according to executable code and/or associated server components used to support computing on server. The data store may include one or more non-transitory computer-readable media, and may collectively comprise logical data, executable code, instructions, and/or associated components to support storage, data management, and retrieval of the calendar and/or user data. The robot data may comprise planned pathways for each robot, incoming tasks for each robot, current locations or operating parameters, etc. the stored items data may include stored location information, expected storage time, specific item information, etc.

The warehouse management system 500 may be a cloud server that possesses larger computing/communication capabilities and computing resources than a robot, and therefore may perform more complex computations or communications than the robot can. For example, a complicated decision process for determining pathways for each robot and assignment of incoming tasks for each robot may be determined by the robot management server, while a determination to slow down in view of a possible collision based on the collected sensor data may be implemented in the instance of the pallet ingress/egress management application or on a robot.

In some embodiments, the robot management server may be further configured to facilitate communication between the robots, and possibly other third-party servers(s). For example, robots may exchange location and/or operation information via the robot management server over the network, directly between robots via the network, and/or through direct device-to-device information exchange, such as over a local pairing or network connection (e.g., Bluetooth, near-field communication, infrared, etc.).

Other third-party servers may be provided using other logical server instances or included with the robot management server according to some embodiments. The third-party servers may provide additional services to the robot management server, or the services may be provided directly to the robots. Server features and services may be related to item storage and retrieval. Examples of other server services may include, but are not limited to, certain ordering services and shipping information and the like related to items stored in the storage facility.

Network may be a conventional type, wired and/or wireless, and may have different configurations, including a star configuration, token ring numerous configuration, mesh configuration, or other configurations. For instance, the network may include one or more local area networks (LAN), wide area networks (WAN) (e.g., the Internet), public networks, private networks, virtual networks, mesh networks, peer-to-peer networks, and/or other interconnected data paths across which multiple devices may communicate. The network may also be coupled to or include portions of a telecommunications network for sending data in a variety of different communication protocols. In some embodiments, the network includes Bluetooth communication networks or a cellular communications network for sending and receiving data including via short messaging service (SMS), multimedia messaging service (MMS), hypertext transfer protocol (HTTP), message queuing telemetry transport (MQTT), direct data connection, wireless application protocol (WAP), email, etc. In some embodiments, during data transmission in calendar creation and/or update, certain security mechanisms may be implemented in network, to ensure no user information is leaked during data transmission between the robots and/or the robot management servers.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method for a robot within a three-dimensional (3D) grid of cells defined by a frame, the method comprising:
   supporting a tray on a superior surface of the robot, the robot arranged within the frame, wherein the frame defines a 3D grid of clearance corridors linking cells of the 3D grid;
   with the robot, translating the tray vertically such that the tray is within a horizontal clearance corridor within the grid of clearance corridors, wherein the horizontal clearance corridor connects the first cell to a second cell of the grid of cells;
   translating the tray horizontally through the horizontal clearance corridor such that the tray is at a first position within the second cell, wherein the tray at the first position is within at least two horizontal clearance corridors;
   translating the tray horizontally such that the tray is at a second position within the second cell; and
   with the robot, depositing the tray at the second position within the second cell, the tray statically supported by the frame at the second position, wherein, at the second position, the tray overlaps a boundary of a horizontal clearance corridor of the 3D grid of clearance corridors.

2. The method of claim 1, further comprising: while the tray is at the second position, receiving a payload deposition on the tray.

3. The method of claim 2, wherein the payload comprises a pallet which is separate and distinct from the tray.

4. The method of claim 2, further comprising:
   capturing a set of measurements of the payload with the payload arranged on the tray at the second position;
   determining a set of morphometric parameters of the payload based on the set of measurements; and
   validating the payload by comparing the morphometric parameters with a geometry of the 3D frame.

5. The method of claim 4, wherein the set of morphometric parameters comprises a weight distribution.

6. The method of claim 1, wherein the grid of cells further comprises a third cell which is spatially interior to the grid of cells, the method further comprising:
   determining a fourth cell for storing the tray and payload; and transporting the tray and payload from the second cell to the fourth cell via a vertical path segment passing through the third cell.

7. The method of claim 6, the method further comprising: transporting the tray from the fourth cell to the second cell via a path which is disjoint from the third cell.

8. The method of claim 1, wherein the second position is vertically offset from the first position.

9. The method of claim 1, wherein the second position is predetermined.

10. The method of claim 1, further comprising, while the robot is within an intermediate cell along the horizontal clearance corridor, adjusting a speed of the robot based on the location of the intermediate cell.

11. The method of claim 10, wherein adjusting the speed of the robot is based on a proximity of the intermediate cell to the second cell.

12. The method of claim 1, wherein, while the tray is in the second position, a vertical centerline of the tray is offset from a vertical centerline of the second cell.

13. The method of claim 1, wherein a set of dampers, which are statically mounted to the 3D frame, support the tray in the second position.

14. The method of claim 1, wherein an inferior surface of the tray defines a set of alignment features, wherein the robot supports the tray at the set of alignment features.

15. The method of claim 1, wherein the first cell stores multiple trays.

16. A method for a 3D grid of cells defined within a storage structure, comprising:
    controlling a robot supporting a tray to travel from a first cell to a second cell, wherein the first cell and second cell are within the 3D grid of cells;
    controlling the robot to move the tray to a predetermined position within the second cell;
    while the tray is at the predetermined position, receiving a payload onto the tray;
    validating a set of morphometric parameters of the payload determined based on:
        a set of sensor measurements of the payload; and
        a geometry of the frame structure;
    determining a first 3D path through the grid of cells, wherein the first 3D path has endpoints at the second cell and a third cell;
    responsive to validation of the payload, controlling the robot to follow the first 3D path and deposit the tray at the third cell;
    determining a second 3D path through the grid of cells, wherein the second 3D path has endpoints at the third cell and at the second cell, and wherein a first set of cells along the first 3D path and a second set of cells along the second 3D path are disjoint; and
    controlling the robot along the second 3D path.

17. The method of claim 16, wherein, while at the predetermined position, the tray overlaps an outer boundary of the second cell.

18. The method of claim 16, wherein the first 3D path comprises segments parallel with each of at least three mutually orthogonal axes.

19. The method of claim 16, wherein the second cell is a spatially peripheral cell of the grid of cells.

20. The method of claim 16, wherein the first 3D path comprises a vertical segment passing through a spatially interior cell of the grid of cells.

* * * * *